US012236186B1

(12) United States Patent
Cohen et al.

(10) Patent No.: US 12,236,186 B1
(45) Date of Patent: Feb. 25, 2025

(54) DIGITALLY AWARE NEURAL DICTATION INTERFACE

(71) Applicant: Wells Fargo Bank, N.A., San Francisco, CA (US)

(72) Inventors: Gerard K. Cohen, Roseville, CA (US); Edmund Gauci, San Jose, CA (US); Eric Miller, Burlingame, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/722,718

(22) Filed: Apr. 18, 2022

Related U.S. Application Data

(63) Continuation of application No. 16/600,242, filed on Oct. 11, 2019, now Pat. No. 11,308,265.

(51) Int. Cl.
*G06F 40/174* (2020.01)
*G06F 3/16* (2006.01)
*G10L 15/26* (2006.01)

(52) U.S. Cl.
CPC ............ *G06F 40/174* (2020.01); *G06F 3/167* (2013.01); *G10L 15/26* (2013.01)

(58) Field of Classification Search
CPC ........ G06F 3/167; G06F 40/174; G06F 40/40; G10L 15/26; G10L 2015/027
See application file for complete search history.

(56) References Cited

U.S. PATENT DOCUMENTS

| 5,231,670 A | 7/1993 | Goldhor et al. |
| 7,343,551 B1* | 3/2008 | Bourdev ............... G06F 40/174 715/224 |
| 8,898,063 B1 | 11/2014 | Sykes et al. |
| 9,946,699 B1 | 4/2018 | Dye et al. |
| 2003/0182622 A1 | 9/2003 | Sibal et al. |
| 2005/0198563 A1* | 9/2005 | Kristjansson ......... G06F 40/174 715/224 |
| 2006/0190489 A1 | 8/2006 | Vohariwatt et al. |

(Continued)

OTHER PUBLICATIONS

Kim et al., "Terminal and Handsfree Device for Servicing Handsfree Automatic Interpretation, and Method Thereof", published on Mar. 11, 2015, Document ID KR 20150026754A., pp. 14. (Year: 2015).*

(Continued)

*Primary Examiner* — Chau T Nguyen
(74) *Attorney, Agent, or Firm* — Foley & Lardner LLP

(57) ABSTRACT

Systems and methods for populating the fields of an electronic form are disclosed. A method includes automatically initiating a hands-free mode of operation based on a first input from a user; receiving a second input corresponding to a value of a current field of a plurality of fields of an electronic form; converting, using a plug-in, the second input into the value for the current field, where the value is identified by comparing syllables of the second input to known syllables associated with a historical input of the user; displaying the value in the current field; determining, using the plug-in, that the value in the current field matches an expected value for the current field; and prompting the user to submit the electronic form in response to determining that the electronic form is complete based on a determination that a predefined subset of the plurality of fields are populated.

20 Claims, 8 Drawing Sheets

(56) References Cited

U.S. PATENT DOCUMENTS

| | | |
|---|---|---|
| 2007/0036290 A1 | 2/2007 | Gasparri et al. |
| 2007/0145138 A1 | 6/2007 | Snyder et al. |
| 2010/0100377 A1 | 4/2010 | Madhavapeddi et al. |
| 2010/0197351 A1 | 8/2010 | Ewell et al. |
| 2010/0217682 A1 | 8/2010 | Chan |
| 2011/0010087 A1 | 1/2011 | Wons et al. |
| 2011/0153324 A1 | 6/2011 | Ballinger et al. |
| 2012/0173222 A1 | 7/2012 | Wang et al. |
| 2013/0117652 A1 | 5/2013 | Folsom et al. |
| 2013/0275875 A1 | 10/2013 | Gruber et al. |
| 2014/0012575 A1 | 1/2014 | Ganong et al. |
| 2014/0012579 A1 | 1/2014 | Ganong et al. |
| 2014/0012580 A1 | 1/2014 | Ganong et al. |
| 2014/0012581 A1 | 1/2014 | Ganong et al. |
| 2014/0012582 A1 | 1/2014 | Ganong et al. |
| 2014/0039895 A1 | 2/2014 | Aravamudan et al. |
| 2014/0244268 A1 | 8/2014 | Abdelsamie et al. |
| 2015/0039987 A1 | 2/2015 | Soulier |
| 2015/0142704 A1 | 5/2015 | London |
| 2016/0300573 A1 | 10/2016 | Carbune et al. |
| 2017/0132191 A1* | 5/2017 | Ringuette ............ G06F 40/174 |
| 2017/0169814 A1 | 6/2017 | Pashine |
| 2017/0192948 A1 | 7/2017 | Gaither et al. |
| 2017/0192950 A1* | 7/2017 | Gaither ................ G06F 40/174 |
| 2018/0122371 A1 | 5/2018 | Vangala et al. |
| 2019/0087398 A1 | 3/2019 | Kolesov et al. |
| 2019/0179612 A1* | 6/2019 | Washio ................ G06F 3/167 |
| 2019/0182176 A1* | 6/2019 | Niewczas ............ G10L 15/22 |
| 2019/0220727 A1 | 7/2019 | Dohrmann et al. |
| 2019/0287168 A1 | 9/2019 | Williams et al. |
| 2019/0303411 A1 | 10/2019 | Wilson et al. |
| 2020/0058309 A1 | 2/2020 | Lee et al. |
| 2020/0227034 A1 | 7/2020 | Summa et al. |

OTHER PUBLICATIONS

Philippov et al., "Method of entering data to electronic device, method of processing voice request, machine-readable media (options), electronic device, server and system", published on Mar. 2, 2018, Document ID RU2646350C2, pp. 17 (Year: 2018).*

Kurt Wagner, "Facebook to Buy Startup for Controlling Computers With Your Mind", Bloomberg, Sep. 23, 2019. 3 pages.

* cited by examiner

FIG. 4B

DIGITALLY AWARE NEURAL DICTATION INTERFACE

CROSS-REFERENCE TO RELATED APPLICATION

This application is a continuation of U.S. patent application Ser. No. 16/600,242, titled "Digitally Aware Neural Dictation Interface," filed on Oct. 11, 2019, which is incorporated herein by reference in its entirety and for all purposes.

TECHNICAL FIELD

Embodiments of the present disclosure relate generally to the field of hands-free input modalities and, in particular, to allowing a user of a device to populate a plurality of fields of a form displayed on the device using a voice input.

BACKGROUND

Traditionally, filling or populating an electronic form using an electronic device (e.g., laptop, smart phone, etc.) required users to manually type in the values of the fields of the form using a keyboard. To improve efficiency and save time, users may receive help filling out the form through software that pre-fills or auto-completes certain fields of the form (e.g., name, home address, etc.). Further, users with impaired eyesight may use screen readers that read aloud text that appears on the display to help them fill out the form. But, such screen readers lack the ability to recognize specific fields of a form. Therefore, improved systems that help users fill out electronic forms faster and more efficiently are desired.

SUMMARY

A first example embodiment relates to a user device configured to enable a conversational electronic form that enables a user to speak in a conversational-like manner to fill out an electronic form. The user device includes a processing circuit comprising one or more processors coupled to non-transitory memory. The processing circuit is structured to: receive, by a microphone of the user device, a speech input from the user corresponding to a value of a current field of a plurality of fields of an electronic form provided on a display screen of the user device; convert the speech input into the value for the current field; display, on a display screen of the user device, the value in the current field for visual verification by the user; prompt, by the speaker of the user device, the user for information corresponding to a value of a next field of the plurality of fields in response to determining that the current field is populated with the corresponding value; and prompt, by the speaker of the user device, the user to submit the form in response to determining that the electronic form is complete based on the populated fields of the electronic form. Beneficially, by moving field-to-field based on a verbal input and output (e.g., a prompt for specific information regarding the next field and a user's voice input in response to the prompt), a conversational electronic form is provided that may be appealing and easy-to-use for users.

Another example embodiment relates to a method for providing a conversational electronic form. The method includes receiving a speech input from a user corresponding to a first field of a plurality of fields of an electronic form provided on a display screen of a user device; converting the speech input from an audible value into text; displaying, on the display screen of the user device, the text in the first field of the electronic form to allow a visual verification by the user; prompting, via a speaker of the user device, the user for information for a subsequent field in the plurality of fields upon each preceding field being populated with text from converted speech inputs; determining the form is complete and ready for submission based on a set of fields being populated with text in the plurality of fields; and enabling a submission of the completed form.

Still another example embodiment relates to a method. The method includes enabling at least a partial hands-free mode of operation of a user device; determining a characteristic of an electronic form provided on a display screen of the user device based on metadata associated with the electronic form; identifying and navigating to a first field of a plurality fields of the electronic form based on the metadata; prompting, via a speaker of the user device, the user for information for the first field and a subsequent field in the plurality of fields upon each preceding field being populated with text from a speech input associated with each field; and enabling a submission of the electronic form based on a received vocal command.

Yet another example embodiment relates to a method. The method for providing a graphical representation via a speech input, the method includes: receiving, by a processing circuit of a user device, a speech input from a user selecting an option from a drop down menu of an electronic form; receiving, by the processing circuit, a speech input from the user selecting an option from the drop down menu; and displaying, on a display screen of the user device, a graphical representation corresponding to the selected option from the drop down menu of the electronic form.

BRIEF DESCRIPTION OF THE FIGURES

These and other features, together with the organization and manner of operation thereof, will become apparent from the following detailed description when taken in conjunction with the accompanying drawings.

FIG. 4B is another display output of the user device during the hands-free mode of operation, according to the example embodiment.

DETAILED DESCRIPTION

Figure 1:
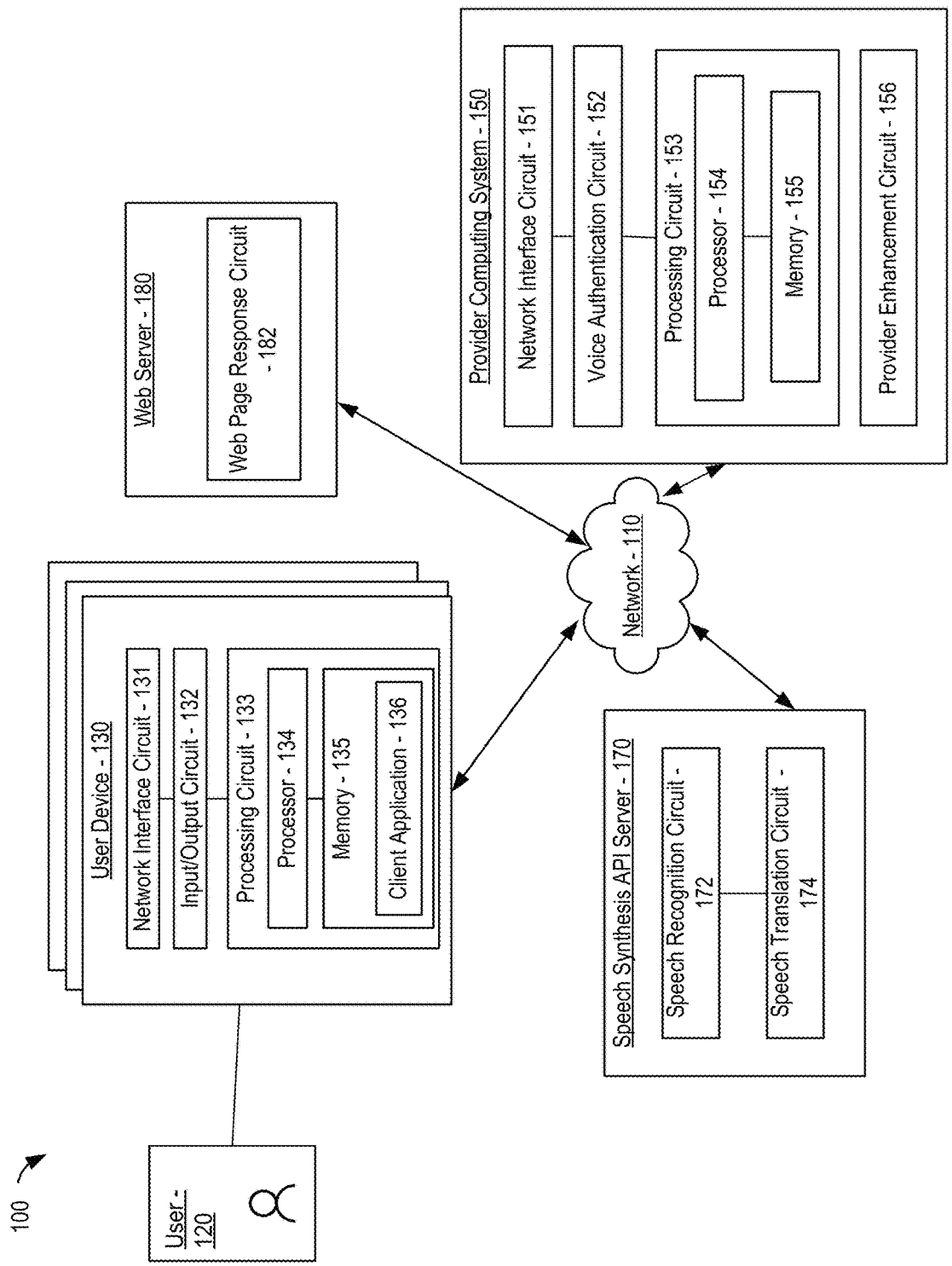
FIG. 1 is a block diagram of a system for providing a hands-free mode of operation of a user device by a user to populate a plurality of fields of a form using the user device, according to an example embodiment.

In the following detailed description, reference is made to the accompanying drawings, which form a part hereof. In the drawings, similar symbols typically identify similar components, unless dictated otherwise. The illustrative embodiments described in the detailed description, drawings, and claims are not meant to be limiting. Other embodiments may be utilized, and other changes may be made, without departing from the spirit or scope of the present disclosure. It will be readily understood that the aspects of the present disclosure, as generally described herein, and illustrated in the figures, can be arranged, substituted, combined, and designed in a wide variety of different configurations, all of which are explicitly contemplated and made part of this disclosure. It should be noted that the terms "voice input" and "speech input" are used interchangeably throughout the disclosure.

The present disclosure relates to systems, apparatuses, and methods of facilitating a hands-free mode of operation for a user to use a voice or speech input to populate a plurality of fields of an electronic form. Users often fill out different types of forms in their regular day-to-day activities. For example, a user may fill out a form to open a checking account at a bank, or may fill out a form for a membership at a local YMCA, etc. Due to the smaller size of the display screen and keyboard on mobile devices as compared to desktops, laptops, etc., filling out forms is often more tedious and error-prone on these types of devices. Irrespective of whether a user uses a mobile device or some other form of a device to fill out the form, the system, methods, and apparatuses described herein relate to providing a hands-free mode of operation for a user to use a voice input to fill out a plurality of the fields of a form in a seamless and easy manner. Beneficially, the systems, apparatuses, and methods provide the user with an experience of a "conversational form" that prompts the user to populate each field of the form. In this regard, the user may seemingly engage in a conversation with the form to aid the filling out of the form quickly and efficiently. As a result, users may be able to complete long forms easier and quicker. Further, a conversational form may be consistent with the expectations of busy consumers in the modern world who may prefer the convenience of a hands-free mode of operation, such as using a voice input, to fill out a form during the course of their regular busy day.

Existing technologies lack the capability to populate electronic forms in this manner. For example, Siri, Alexa, or other virtual assistants that enable audible commands to be implemented (e.g., changing the volume of a speaker, making a purchase, etc.) do not enable a filling out of an electronic form in this manner. In this regard, a user may command these virtual assistants to navigate a web browser to an Internet page that displays a form and then the user must revert to conventional manual entry of the fields of the form. This results in a noticeable inconvenience in the usage of these virtual assistants.

The systems, methods, and apparatuses described herein enable accepting a voice input from a user to populate all of or mostly all of the fields of a form by stepping through the fields of the form, one field at a time, without the necessity of a keyboard. The various embodiments of the present disclosure utilize a speech synthesis Application Programmer Interface (API) to convert a received user voice input from speech-to-text (e.g., alpha, numeric, or alphanumeric text). Metadata associated with the form is used to determine the characteristics of the form. For example, the metadata provides an indication regarding the total number of fields, the names of the fields, the maximum number of characters allowed in a field, etc. The systems, methods, and apparatuses described herein utilize a plug-in structured to populate the field of the form based on the characteristics of the field as determined from the metadata. As the user populates a first field, a prompt is provided to the user to populate a next field until all or a sufficient number of fields are populated for submission. Thus, the systems, apparatuses, and methods described herein facilitate providing a "conversational form," whereby there is a continuous interaction between the system and the user based on prompting the user to enter a value for each field of the form until the form is completely or sufficiently populated. This is analogous to a "conversation," where people may talk back and forth until the topic of discussion is fully/completely discussed.

It should be understood that not all embodiments require the user to be prompted to enter a voice input for the value of a field of a form. For example, in some embodiments, the systems and methods described herein move from a field that has been populated to a next field after a predetermined amount of time without necessarily prompting the user (i.e., an automatic movement from one field to the next based on the passage of a predetermined amount of time). In this instance, the user may keep track of the progress of filling out the form through a visual display of the form on the display screen of the device. Further and in some embodiments, a user may choose to enter the value of a subset of fields of the form through means other than voice input such that the filling of the form may be through a combination of voice-input and manual-input (e.g., typed input). Thus, those of ordinary skill in the art will recognize various natural and logical alternatives to the systems, methods, and apparatuses of the present disclosure with all such alternatives intended to fall within the spirit and scope of the present disclosure.

The "form" may be any type of form that is presented electronically. Thus, the "form" may be an application, such as a housing application, a credit card application, an account application, a club membership application (e.g., a gym), and so on. The form may also be a survey. The form may further include a log-in page for various things, such as an account (e.g., a club account, a financial account, and the like). The unifying characteristics are that the form is electronically displayed and includes at least one field that needs to be filled or populated. The "field" of the form refers to a box where information to be populated (e.g., name, date of birth, etc.). In other words, the "field" refers to a single item belonging to the form where a user input is or may be sought. The "value" refers to the characters that actually populate the field (e.g., a number or a string of alpha, numeric, or alphanumeric characters used to populate the field of a form).

Referring now to FIG. 1, a system 100 that facilitates and enables a hands-free mode of operation of a device for receiving a voice input to populate the fields of a form is shown, according to an example embodiment. The "hands-free mode of operation" refers to the ability of a user of the device to use the device without or primarily without use of their hands/fingers. In particular and as primarily used herein, the hands-free mode of operation refers to the ability of the user to populate the fields of a form without using a keyboard (i.e., without manual entry of the field values). However, if desired, manual entry, such as via a keyboard, may be used to supplement the hands-free mode of operation to fill out the form. As shown, the system 100 includes a network 110, a user 120 associated with a user device 130, a provider computing system 150, a speech synthesis API server 170, and a web server 180. The user 120, the user device 130, the provider computing system 150, the speech synthesis API server 170, and the web server 180 may be coupled to each other and therefore communication through the network 110. The network 110 may include one or more of the Internet, cellular network, Wi-Fi, Wi-Max, a proprietary banking network, or any other type of wired and/or wireless network.

The user device 130 is a computing device owned by, associated with, or otherwise used by a user 120. The user may be an individual or group of individuals using the user device 130. The user device 130 is structured to provide a hands-free mode of operation for the user 120 so that the user may provide a voice input that is converted to text (e.g., alphanumeric text) to populate a plurality of fields of a form. In some embodiments, the user device 130 is a mobile device, which includes any type of mobile device including, but not limited to, a phone (e.g., smart phone, etc.), a tablet computer, a personal digital assistant, wearable devices (e.g., glasses), and the like. In other embodiments, the user device 130 is a primarily non-mobile device, such as a desktop computer. In some other embodiments, the user device 130 is a device that is only used by a user. For example, in this scenario, the device may be an automated teller machine (ATM) that is equipped with a microphone, a speaker, and a display. In the example shown, the user device 130 is structured as a smart phone.

The user device 130 is shown to include a processing circuit 133 having one or more processors 134 and a memory 135, a network interface circuit 131, and an input/output circuit 132. The memory 135 is shown to include or store a client application 136. In this regard, the memory 135 may contain instructions belonging to the client application 136, which can be executed by the one or more processors 134 of the user device 130. The network interface circuit 131 is structured to enable the user device 130 to exchange information over the network 110. The input/output circuit 132 is structured to facilitate the exchange information with the user 120. An input device of or coupled to (depending on the embodiment) the input/output circuit 132 may allow the user to provide information to the user device 130, and may include, for example, a mechanical keyboard, a touchscreen, a microphone, a camera, a fingerprint scanner, and so on. An output device of or coupled to (depending on the embodiment) the input/output circuit 132 allows the user to receive information from the user device 130, and may include a display device (e.g., a display screen such as a touchscreen), a speaker, illuminating icons, LEDs, and so on. Each of these components are explained more fully herein with respect to FIG. 2.

The speech synthesis API server 170 is a computing system that is coupled through the network 110 to the user device 130 and the other systems/components of FIG. 1. The speech synthesis API server 170 may be a back-end server or computing system comprising one or more processors, memory devices, network interfaces, and computing components as described herein that facilitate and enable various operations. The speech synthesis API server 170 is structured to provide a speech synthesis API. The speech synthesis API is structured to recognize a voice input from a user 120, and to convert the voice input into text, such as alphanumeric text (and, in some embodiments, vice versa-from text into an audible noise). In some embodiments, the user device 130 lacks built-in support for a speech synthesis API. In such embodiments, the user device 130 utilizes the speech synthesis API provided by the speech synthesis API server 170 to convert the user's 120 voice input into text and vice versa. In other embodiments, the user device 130 includes a speech synthesis API (may be different than that provided by the server) that converts the voice input into text. The speech synthesis API server 170 is also shown to include a speech recognition circuit 172 and a speech translation circuit 174.

The speech recognition circuit 172 is structured to recognize and convert the user's 120 voice input into text. In operation, the user's voice may be received via a microphone of the user device 130, which converts the voice into data and transmits the data to the speech synthesis API server 170. The speech recognition circuit 172 breaks down the user's 120 voice input (i.e., the data) into syllables. The speech recognition circuit 172 then compares the syllables of the user's 120 voice input with known syllables stored in the non-transitory memory of the speech recognition circuit 172 to identify a plurality of syllables in the voice input. The speech recognition circuit 172 may then convert the plurality of syllables into characters through, for example, a look-up table maintained in the non-transitory memory of the speech recognition circuit 172 to complete the conversion of the user's 120 voice input into text. The converted text produced by the speech recognition circuit 172 is used to populate a relevant field of an electronic form. In other embodiments, a different process may be used to convert a user's voice input into alphanumeric text.

The speech synthesis API server 170 is further structured to translate text (for example, text that is retrieved from an earlier populated field value of the form) into a voice output so that the value of the field may be read aloud back to the user. In some embodiments, the speech synthesis API server 170 may be structured to read-out the field values of the form, which enables the verification of the field values for users 120 with visual impairments thereby enabling assistive technology support for such users 120.

The speech translation circuit 174 is structured to convert the field value retrieved from the electronic form into an audible output. The speech translation circuit 174 may access a look-up table in the non-transitory memory of the speech translation circuit 174 to identify syllables in the alphanumeric text based on the text in the field. The speech translation circuit 174 then sends the identified syllables to the user device 130 to read out the determined voice output.

The web server 180 is a computing system that provides and hosts webpages/websites that are reachable by the user devices 130 via the network 110. The web server 180 may be a back-end server or computing system comprising one or more processors, memory devices, network interfaces, and computing components as described herein that facilitate and enable various operations. The web server 180 is structured to respond to requests from clients such as the user device 130 to access a webpage identified by a particular Internet address. The web server 180 provides the contents of the requested webpage in response to a request for the web page from the user device 130. The web server 180 includes a web page response circuit 182. The web page response circuit 182 retrieves from the non-transitory memory of the web server 180 relevant information pertaining to a particular webpage requested by the user device 130. In some embodiments, the relevant information includes the metadata associated with a webpage hosted by the web server 180, which has been requested to be downloaded by or provided to the user device 130.

The provider computing system 150 is owned by, managed/operated by, or otherwise associated with a provider institution. The provider institution may be a financial institution that offers one or more financial products and services (e.g., banking and banking applications such as mobile banking, lending products, payment and money transfer products and services, etc.). Further and additionally, the provider institution is an entity that facilitates and enables, at least partly, operation of the hands-free input modality for a user to populate the fields of an electronic form in the system 100. As described herein and in some embodiments, the provider computing system 150 is structured to facilitate the download of processing logic (in the form of a plug-in) to the user device 130 that enables an electronic form to be populated via a voice input.

As shown, the provider computing system 150 includes a processing circuit 154 including a processor 155 and a memory 156, a network interface circuit 151 structured to couple the system 150 to the other components of FIG. 1 through the network 110, a voice authentication circuit 152, and a provider enhancement circuit 156. The processor 155 may be implemented as one or more application specific integrated circuits (ASICs), field programmable gate arrays (FPGAs), a group of processing components, or other suitable electronic processing components. The memory 156 may be one or more devices (e.g., RAM, ROM, Flash memory, hard disk storage) for storing data and/or computer code for completing and/or facilitating the various processes described herein. The memory 156 may be or include non-transient volatile memory, non-volatile memory, and non-transitory computer storage media. The memory 156 may include database components, object code components, script components, or any other type of information structure for supporting the various activities and information structures described herein. The memory 156 may be communicably coupled to the processor 155 and include computer code or instructions for executing one or more processes described herein. More details about the various components of the provider computing system 150 are provided during with respect to FIG. 3.

Figure 2:
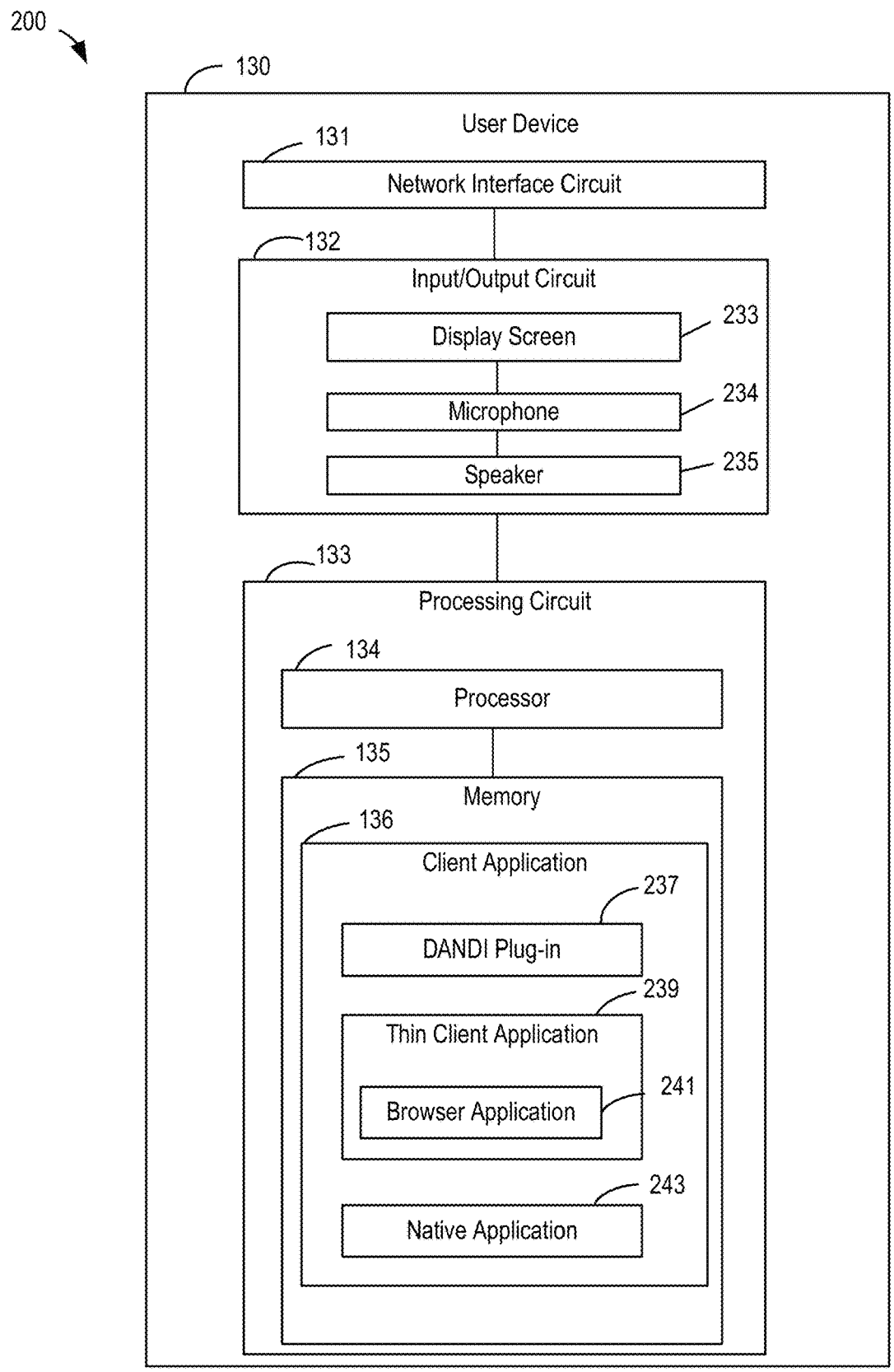
FIG. 2 is a block diagram of the user device of FIG. 1.

Referring now to FIG. 2, the details of the user device 130 are shown, according to an example embodiment. As mentioned above, the user device 130 includes a network interface circuit 131 and an input/output circuit 132. The network interface circuit 131 is structured to establish, enable, and maintain a connection with other components of the system 100 via the network 110. In this regard, the network interface circuit 131 is structured to enable the user device 130 to exchange information (e.g., data) over the network 110. The network interface circuit 131 includes logic and hardware components that facilitate a connection of the user device 130 to the network 110. For example, the network interface circuit 131 may include a cellular modem, a Bluetooth transceiver, a Wi-Fi router, a radio-frequency identification (RFID) transceiver, and/or a near-field communication (NFC) transmitter. Further, in some arrangements, the network interface circuit 131 includes cryptography capabilities to establish a secure or relatively secure communication session with certain components, such as the provider computing system 150.

The input/output circuit 132 is structured to enable the exchange of communication(s) (e.g., data, information, instructions, etc.) with a user of the user device 130. In this regard, the input/output circuit 132 is structured to exchange data, communications, instructions, etc., with an input/output component of the user device 130. Accordingly, in one embodiment, the input/output circuit 132 includes one or more input/output devices, such a display screen 233 (or, display), a microphone 234, and a speaker 235. In another embodiment, the input/output circuit 132 may include machine-readable media for facilitating the exchange of information between the input/output device and the components of the input/output circuit 132. In still another embodiment, the input/output circuit 132 may include any combination of hardware components (e.g., input/output components such as a touchscreen) and machine-readable media. In the example shown, the input/output circuit 132 is machine-readable media executable by the one or more processors 134 and, in turn, coupled to the input/output devices (e.g., display screen 233, microphone 234, and speaker 235).

The display screen 233 is structured to present visual displays (e.g., graphical user interfaces) to a user 120. In particular, the display screen 233 is structured to provide and present an electronic form for the user 120 to fill. The display screen 233 may present prompts, notifications, and confirmations to the user 120. In the example shown, the display screen 233 is structured as a touchscreen display device.

The microphone 234 is structured to receive a voice input from the user 120 to fill a value of a field of the electronic form displayed by the display screen 233. The microphone 234 may have any type of typical structure included with a user device, such as the smart phone user device structure.

The speaker 235 is structured to provide an audible output. The audible output or noise may include a prompt, a notification, and a confirmation to the user 120 during the process of populating the fields of an electronic form. The speaker 235 may have any type of typical structure included with a user device, such as the smart phone user device structure. In some embodiments, the speaker 235 and the microphone 234 may be the same physical device/component of the user device.

Referring still to FIG. 2, the user device 130 includes a client application 136. The client application 136 is a computer program that executes or runs on the user device 130. The client application 136 may be implemented as a thin client application 239 or a native application 243. A thin client application 239 is a computer program that typically executes on a networked computer with limited resources of its own (i.e., not locally on the user device). Thus, a thin client application fulfils or obtains its computational needs by using the resources of a backend server. In some embodiments, the server is the provider computing system 150. In other embodiments, the server is a third-party server. In contrast, the native application 243 is a computer program that uses the computation power of the device in which it resides. For example, as mentioned above, the user device may be an ATM. In which case, the native application may be hard coded into the non-transitory memory of processor(s) of the ATM.

In some embodiments, the client application 136 is incorporated into an existing application, such as a mobile banking application. In this regard, the client application 136 includes an API and/or a software development kit (SDK) that facilitates the integration of other components with the client application 136. In other embodiments, the client application 136 is a separate application implemented on the user device 130. The client application 136 may be downloaded by the user device 130 prior to its usage, hard coded into the non-transitory memory of the user device 130 (i.e., a native application), or be a web-based application. In some implementations, the user 120 may have to log onto the user device 130 and access the web-based interface before using the client application 136.

As an example, the client application 136 may be a web browser application 241 (e.g., Google Chrome). In some embodiments, the web browser application 241 is structured to include a speech synthesis API for converting alphanumeric text to speech, and vice versa. In other embodiments, this functionality is lacking.

The client application 136 is shown to include a digitally aware neural dictation interface (DANDI) plug-in 237. The DANDI plug-in 237 (e.g., add-in, add-on, extension, etc.) is a program that adds additional features to the client application 136. In one embodiment, the DANDI plug-in 237 is implemented as program code in the JavaScript programming language. In other embodiments, the DANDI plug-in may be a different structure (e.g., constructed with a different programming language). The DANDI plug-in 237 may be a downloadable component, which can be an add-on to an existing application such as a web browser application (e.g., Google Chrome). Thus, the DANDI plug-in 237 may include one or more APIs and/or SDKs that facilitate integration of the DANDI plug-in 237 into the client application 137. In other embodiments, the functionality of the DANDI plug-in 237 described herein may be hardcoded in the non-transitory memory accessible to a processor of the device (e.g., user device). In this instance, the DANDI plug-in 237 is a native feature on the device. In yet other embodiments, the DANDI plug-in 237 may be hard-coded into the client application such that the plug-in is not a "plug-in"; rather, the features and functionalities described herein are embedded as part of the client application. Thus, while described herein as a plug-in, it should be understood that this implementation embodiment is not meant to be limiting as the present disclosure contemplates various other structural implementations.

The DANDI plug-in 237 is structured to integrate with the client application 136. In the embodiment shown, the DANDI plug-in 237 is a downloadable software component, which integrates with the client application 136 after being downloaded. For example, the DANDI plug-in 237 may be an add-on to the web browser application 241. In another embodiment, the DANDI plug-in 237 is hard coded into the client application 136 (as opposed to being downloadable). For example, in the case of the client application 136 being a native application 243 and when the device is an ATM, the DANDI plug-in 237 may be hard coded into the non-transitory memory for execution by the processor(s) of the ATM. In this way, the DANDI plug-in 237 is not downloaded to the ATM, but is ready for use upon running/using the ATM.

The DANDI plug-in 237 is structured to enable the client application 136 to determine and identify the characteristics of each field in the plurality of fields of an electronic form. In this regard, the DANDI plug-in 237 is structured to perform an analysis of the metadata associated with the electronic form. The metadata may be provided by the web server 180 to the DANDI plug-in 237. Alternatively, the DANDI plug-in 237 may extract the metadata from the webpage hosting the form (or, from the form itself when it is not hosted by a web page, such as a PDF form). The metadata associated with an electronic form defines the characteristics of each field in the plurality of fields of the electronic form. The characteristics may include, but are not limited to, an indication regarding a total number of fields of the form, the names of the fields, the data types of each of the fields, the maximum number of characters allowed in a field, the range of acceptable values for a field, etc. For example, in one embodiment, the data type for a "date" field of the electronic form is in MM-DD-YYYY format, with the value of the MM field being a 2-digit number, and the acceptable range of values for the MM field being from 01 through 12. The DANDI plug-in is structured to analyze the metadata to determine various characteristics of the form and, in particular, each of the fields of the form.

The DANDI plug-in 237 is also structured to convert the voice input for each field of the electronic form into a value for the field. As described above and in one embodiment, the speech synthesis API function is provided within the client application 136 (e.g., web browser application 241). In this regard and in some embodiments, the DANDI plug-in 237 causes execution of the speech synthesis API of the web browser application 241 to convert the user's 120 voice input for a specific field into alphanumeric text. In this case, the DANDI plug-in 237 is coupled to the speech synthesis API of the client application 136 for converting the voice input into alphanumeric text. The DANDI plug-in 237 may then cause a populating of the text into a field in the electronic form.

In another embodiment, the speech synthesis API is not included with the client application 136. For example, the client application 136 may be a native application 243 (e.g., a client application executing on an ATM) that lacks support for a web browser to execute the speech synthesis API. Rather, the speech synthesis API is provided by the speech synthesis API server 170. In such embodiments, the DANDI plug-in is structured to interface with and access the speech synthesis API server 170 over the network 110. The DANDI plug-in may then transmit the voice input to the speech synthesis API server 170 over the network 110 to convert the user's 120 voice input into text.

In still another embodiment, the DANDI plug-in 237 itself may include the speech synthesis API. In this regard, the speech synthesis API server provides the speech synthesis API that is integrated into the DANDI plug-in 237. In this situation, the client application via the DANDI plug-in 237 itself is structured to receive a voice input, determine the characteristics of the voice input, and convert the voice input into text that is used as the value to populate the fields of the electronic form.

The DANDI plug-in 237 is further structured to navigate through the fields of the electronic form using the characteristic of the fields of the electronic form. The DANDI plug-in 237 is structured to determine and identify the characteristic of fields in the form by analyzing the metadata associated with the form from the web server 180. Thus, the web server 180 is coupled to the client application and DANDI plug-in 237. In another embodiment, the metadata analysis function may be included with the DANDI plug-in 237. This arrangement may be used on devices that may lack this feature, such as potentially certain ATMs. Irrespective, the DANDI plug-in 237 may analyze the metadata on the display that is providing the form through a variety of techniques. For example, in one embodiment, the DANDI plug-in parses the metadata that is implemented in one of a variety of languages like XML, HTML, etc. that describe the various fields of the form to determine the number of fields in the form, the range of values that are associated with each field of the form, and so on. During the metadata analysis, the DANDI plug-in 237 also determines or identifies the fields that make up the electronic form, and identifies the relative positions of the fields on the electronic form. The DANDI plug-in 237 uses the acquired knowledge of the relative positions of the fields to determine a priority order of navigating to and populating the fields of the form. In one embodiment, a determined order for populating the fields is vertical (i.e., top most field to bottom most field). In another embodiment, a determined order is left to right and top to bottom in an analogous manner to left-to-right reading. In still another embodiment, the determined order is based on the characteristics of the fields based on the metadata. For example, only three of the depicted six fields may be required to be populated in order to enable/allow submission of the electronic form. However, the three fields are randomly dispersed on the form (e.g., first, fourth and sixth fields when reading left-to-right and top-to-bottom, etc.). In this situation, the determined order is these three forms first in a reading manner (left-to-right and top-to-bottom). At this point, a prompt may be provided to the user indicating that all the required fields are populated and inquiring whether the user would like to submit/review the form or populate the optional fields. In this manner, navigation to the fields may be strategic rather than a rote left-to-right or top-to-bottom manner. Such a process may save time and improve efficiency.

Navigating through each field of the form may occur via a variety of ways. In this regard, the DANDI plug-in 237 is structured to navigate to a next field of the form via various different processes. For example, after a field is populated, the DANDI plug-in 237 using a timer function may automatically navigate to the next field according to the defined order (described above) after the passage of a predetermined amount of time (e.g., 1.5 seconds, 3 seconds, etc.). In another example, the DANDI plug-in 237 may receive a vocal command that instructs movement to the next field (e.g., "Please move to the next field"). Based on the metadata analysis, the client application via the DANDI plug-in 237 knows the information that is expected for a particular field (e.g., date of birth) such that when a command is received, the command is easily differentiated from the information used to populate the field. In still another example, a manual input from the user may be used to cause the movement from field-to-field (e.g., on the touchscreen, the user may touch the field he/she wants to fill next). In yet another embodiment, a prompt is provided by the DANDI plug-in 237 (e.g., using a speaker of the user device) to request information for the next field in the form according to the determined order of populating the fields. An example is as follows: "[Field 1—Name] Please provide your name." [Field 2—date of birth] Thank you. Please provide your date of birth." [Field 3—address]. Please provide your address." In this example, once information is received from the user and it is populated into the form, a confirmation is provided (e.g., thank you) and the information for the next field is asked. Contemporaneously, the field where information is currently sought may be highlighted on the screen. This enables two forms of indications to the user (i.e., the audible prompt for certain information and the visual highlighting of the form). In this embodiment, a conversational form is provided. Once all or the required fields are populated, a prompt may be provided to user inquiring him/her to submit the form and/or review their answers before submission. The form may then be submitted (e.g., by clicking submit or via a voice command). In other embodiments, any combination of these examples may be used.

In some embodiments, one or more functions associated with the DANDI plug-in may be performed by the provider computing system 150. Thus, the DANDI plug-in via the user device may transmit relevant data or information to the system 150 for processing with specific processing capabilities described below.

Figure 3:
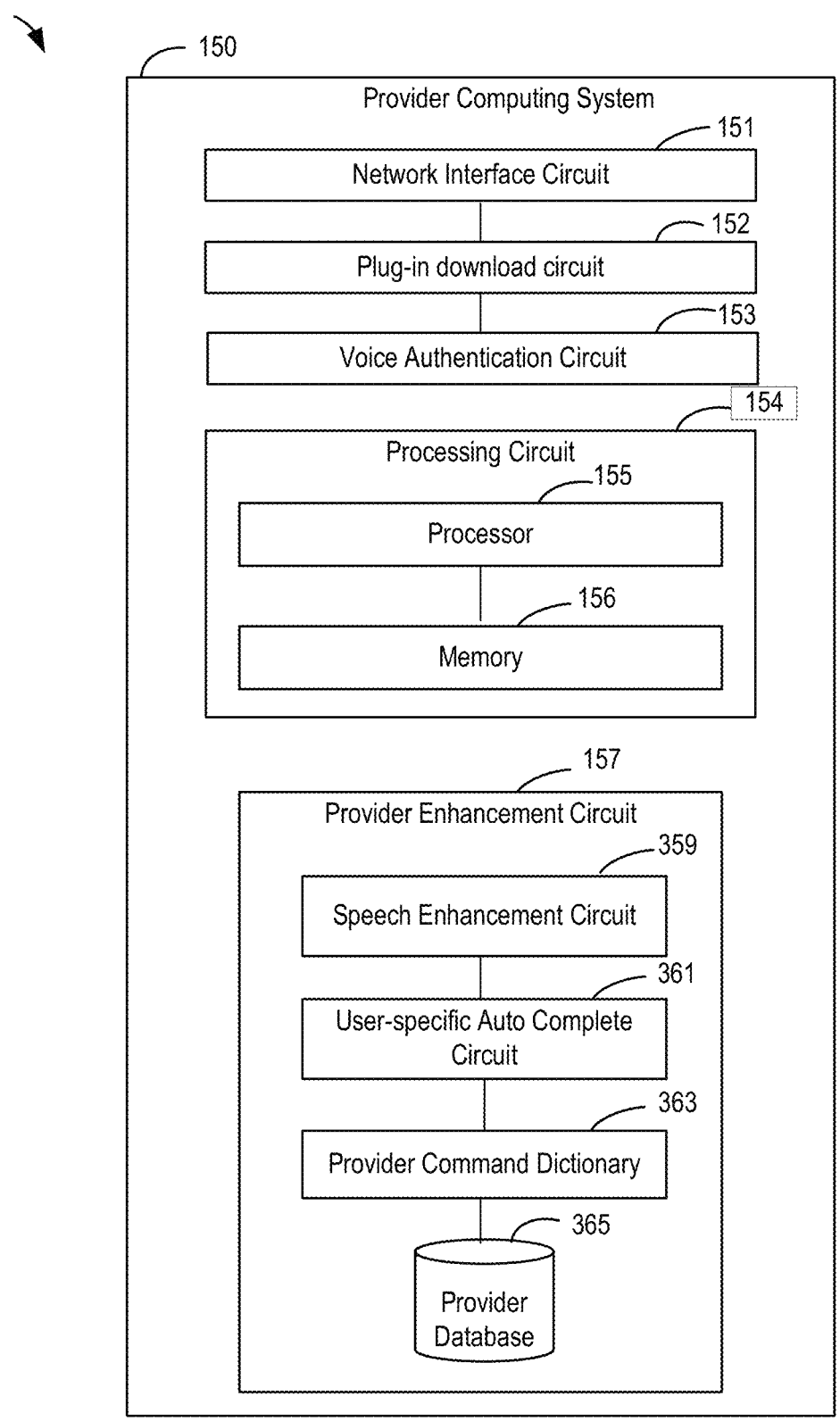
FIG. 3 is a block diagram of the provider computing system of FIG. 1.

Referring now to FIG. 3, the provider computing system 150 of FIG. 1 is shown according to an example embodiment. The provider computing system 150 is shown to include a network interface circuit 151, a plug-in download circuit 152, a voice authentication circuit 153, a processing circuit 154, and a provider enhancement circuit 157. The processing circuit 154 includes one or more processors 155 and a non-transitory memory 156. The processing circuit 154 is described above.

The network interface circuit 151 (or, network interface) is structured to enable the provider computing system 150 to establish connections with other components of the system 100 via the network 110. The network interface circuit 151 is structured to enable the provider computing system 150 to exchange information over the network 110 (e.g., with the user device 130). The network interface circuit 151 includes program logic that facilitates connection of the provider computing system 150 to the network 110. The network interface circuit 151 supports communications between the provider computing system 150 and other systems, such as the user device 130. For example, the network interface circuit 151 may include a cellular modem, a Bluetooth transceiver, a Bluetooth beacon, a radio-frequency identification transceiver, and a near-field communication transmitter. Thus, the network interface circuit 151 may include the hardware and machine-readable media sufficient to support communication over multiple channels of data communication. Further, in some arrangements, the network interface circuit 151 includes cryptography capabilities to establish a secure or relatively secure communication session with the user device 130.

The plug-in download circuit 152 is structured to create, maintain, and provide the DANDI plug-in 237 for download to the user device 130. For example, the user device 130 may request the download of the DANDI plug-in 237 from the plug-in download circuit 152. In some embodiments, upon receiving a request from a user device 130 for download of the DANDI plug-in, the plug-in download circuit 152 causes the DANDI plug-in 237 to be downloaded to the user device 130. Thus, this embodiment is used when the DANDI plug-in 237 functionality is not hardcoded into either the device or the client application: i.e., when the described functionality is being added to an existing application (e.g., a web browser).

The voice authentication circuit 153 is structured to authenticate a voice of a user received via the network interface circuit 151 from a user device 130. In some embodiments, authentication of a user 120 may be required to use the hands-free mode of operation via the DANDI plug-in 237 based on the requirements of the form (e.g., a credit card application provided by the provider institution). The voice authentication circuit 153 is structured to facilitate authentication/verifying a user's voice. In some embodiments, the voice authentication circuit 153, upon receiving a voice input from the user device 130, compares the voice input with known voice samples of the user's speech stored in the provider database 365 (described herein) for a match or a substantial match. The voice authentication circuit 153 then notifies the user device 130 about the result of the match. In case of a match, the user device 130 may skip the step of the user 120 requiring the user to log in with authentication credentials since the user 120 is recognized/ authenticated through the user's 120 voice. Thus, in some embodiments, the voice authentication circuit 153 is structured to provide the benefit of facilitating the continuation of a user's 120 session without the necessity of the user being forced to provide log-in authentication credentials during the middle of using a commercial banking application. This feature may be advantageous for forms that require sensitive information to be provided (e.g., credit card applications, forms that require personal identifying information, etc.). In operation, the user may be authenticated into their device and then subsequently authenticated via their voice to use the hands-free mode of operation to fill out the form. In this regard and based on the metadata analysis, even predefined sensitive information is determined to be required for the form, the DANDI plug-in 237 via the client application may automatically transmit the user's voice to the voice authentication circuit 153 for an additional authentication analysis to be performed. This adds an extra layer security that is not typical for most forms that are populated.

The provider computing system 150 further includes a provider enhancement circuit 157 that includes a speech enhancement circuit 359, a user-specific auto-complete circuit 361, a provider command dictionary 363, and a provider database 365. The provider database 365 is structured to hold, store, categorize, and/or otherwise serve as a repository for information regarding the user (e.g., the user's historical voice inputs). The provider database 365 is structured to store and selectively provide access to the stored information. The provider database 365 may have any one of a variety of computing structures. Although shown as being a separate component of the provider computing system 150, in some embodiments, the provider database 365 may be part of the memory 156.

The speech enhancement circuit 359 is structured to enhance the quality of the input voice samples received from a user device 130 for storage in the provider database 365. In some embodiments, the enhancement in the quality of the input voice samples may be based on the removal of undesirable noise from the samples (e.g., the input voice samples may include undesirable noise from a potentially noisy surrounding of the user 120 due to the user 120 being in a busy marketplace, using public transportation, etc.). The client application 136 of the user device 130 may transmit samples of a user's 120 voice input to the speech enhancement circuit 359. The speech enhancement circuit 359 digitally enhances the user's voice samples by applying filtering and digital processing techniques in order to obtain better quality samples of the user's original voice input. In some embodiments, the speech enhancement circuit 359 is structured to provide the ability to mitigate distortions or irregularities in the user's voice input due to the presence of an accent in the voice, or a temporary condition (for example, a cold) affecting the user's voice, thus enhancing the quality of the voice input. For example, in one embodiment, the speech enhancement circuit 359 extrapolates the missing or distorted syllables in the user's 120 voice input based on comparing the current voice input of the user 120 with past voice inputs received from the particular user 120 stored in the provider database 365. In some embodiments, the speech enhancement circuit 359 executes artificial intelligence based machine learning algorithms to compare the identified syllables in the user's voice input to a database of syllables stored in the provider database 365. The algorithms find the closest match for any distorted or otherwise irregular syllables in the user's voice input in the provider database 365, and cause such syllables to be replaced by the corresponding matching syllables in the provider database 365.

In some embodiments, the speech enhancement circuit 359 is structured to translate a user's 120 voice input from a first language to a second language (e.g., from a foreign language to the English language), such that the translated voice input may be used to populate the fields of a form in the second language. The speech enhancement circuit 359 is, thus, structured to provide an advantage in that the form is able to be populated in English even with the voice input is in a different language. Thus, providers of the electronic form need not translate their form(s) into various languages to accommodate the various languages of the world. Rather, a translation provided by the circuit 359 may occur to enable a wide usage.

The provider command dictionary 363 is structured to provide a dictionary of commands recognized by the hands-free voice input system. In some embodiments, the provider command dictionary 363 receives a voice input representing a user command from the client application 136 of the user device 130. For example, a user may provide to the user device 130 to modify the value of an earlier populated field. As another example, a user 120 may issue voice commands for the initiation, and termination of hands-free mode of operation. As still another example, a user 120 may issue a command to read-out all the fields of a form populated so far (the command may be issued in the middle of populating the form). It should be understood that the examples of commands described herein are non-limiting in nature, and the provider command dictionary 363 is structured to support a much larger set of commands than the examples provided. Thus, rather than using the voice input to just populate the electronic form, the commands are used to provide additional functionality that may enhance the user experience.

In some embodiments, the client application 136 of the user device 130 communicates with the provider command dictionary 363 through the network interface circuit 151 of the provider computing system 150 to leverage the increased capability of command recognition in the provider command dictionary 363. The provider command dictionary 363 thus expands the command recognition capability built into the client application 136 of the user device 130 via the DANDI plug-in 237.

The user-specific auto-complete circuit 361 is structured to provide auto-complete suggestions for a particular user 120. In some embodiments, the user-specific auto-complete circuit 361 receives voice inputs from the client application 136 of the user device 130. The user-specific auto-complete circuit 361 then stores the voice inputs in the provider database 365 on a per-user basis, thus accumulating user 120 provided voice inputs for multiple fields of multiple forms. Further, the user may be a customer of the provider institution. In which case, the provider computing system 150 may store various other information regarding the user (e.g., name, date of birth, address, ethnicity of the user, etc.). In some embodiments, the user-specific auto-complete circuit 361 utilizes the voice inputs stored in the provider database 365 for a specific user 120 to perform a multi-field analysis of user's stored voice inputs to determine auto-complete suggestions. For example, in one embodiment, the user-specific auto-complete circuit 361 executes algorithms to recognize patterns in a user's 120 voice inputs across multiple fields of multiple forms stored for the user 120 in the provider database 365 to provide specific auto complete suggestions that are tailored to the particular user 120. This may speed up a filling of the form.

In operation, a user 120 interacts with the user device 130 to initiate the process of a hands-free mode of operation for populating a form using the user device 130. The form may be an application (e.g., credit card application, account application, gym membership application, etc.), a survey, and any other form that is provided electronically. In some implementations, the user provides an authentication credential to access the user device 130 (e.g., a biometric, a passcode, etc.). In one embodiment, the user 120 clicks on a portion of a form or a part of the display screen 233 of the user device 130 to initiate the hands-free mode of operation. For example, a manual input—e.g., the clicking on a DANDI icon—is implemented to initiate the hands free mode of operation. In another example, the user 120 may provide a specific voice command (e.g., initiate "DANDI"). In either situation, the client application 136 running on the user device 130 recognizes the command to initiate the hands-free mode of voice input to subsequently enable the populating of the fields using a voice input. Upon enabling the hands-free mode of operation, the user device 130 may be structured to provide the indication to the user 120 that the hands-free input modality is active. For example, in one embodiment, the user device 130 is structured to provide an animation on the display screen 233 of the user device 130 regarding the indication (e.g., an illuminating icon, a graphic, etc.).

As described above, the user device 130 may prompt the user 120 through the microphone 234 to provide a voice input for the value of a field of the form that the user wants to populate once the hands-free mode of operation is enabled. As alluded to before, in one embodiment, the DANDI plug-in 237 is structured to navigate to various fields of an electronic form, and populate the values in the fields of the form. As described above, once all or a sufficient number of the fields are populated, the form may be submitted (e.g., the application submitted, the PDF determined to be complete and then saved, access to an account provided, etc.).

While certain functions are described above separately with respect to the DANDI plug-in 237, in some embodiments, various functions may be included with the DANDI plug-in 237. For example and as described above, the DANDI plug-in may include the speech synthesis API. In this regard and when running, the DANDI plug-in 237 is structured to receive a voice input and then convert the voice input to alphanumeric text. In other embodiments and when the client application includes a similar function, the speech synthesis API of the DANDI plug-in may be disabled to reduce the processing requirements of the DANDI plug-in. In this scenario, the voice-to-text conversion may be done by the speech synthesis API of the client application and then provided to the DANDI plug-in 237. Accordingly, in one embodiment, the DANDI plug-in 237 may include the speech synthesis API and the metadata analysis function. As a result, the DANDI plug-in 237 may itself be structured to convert a voice input to alphanumeric text, navigate between the fields of the form, and ultimately enable the user to populate the form. As still another example, certain of the functions, such as speech enhancement, voice authentication, and translation described above of the provider computing system 150 may also be included with the DANDI plug-in 237. In some embodiments, by keeping these functions accessible via the plug-in and not a part of the plug-in 237, the local processing requirements for running the plug-in 237 may be reduced to improve the processing speed.

In the example shown, the DANDI plug-in 237 includes the speech synthesis API and metadata analysis feature. Further, the voice authentication, translation, and enhancement features are provided by the provider computing system to alleviate the size of the plug-in 237. That said, when the plug-in 237 is used with an application that already has a built in speech to text conversion feature, the plug-in 237 may use the output of that feature to reduce duplicative features. Alternatively, the plug-in 237 may use the output of that feature for comparison purposes to the determined text by the plug-in 237. This may be used to help the plug-in 237 "learn" and become more refined over time.

In one specific example, the provider computing system 150 may include artificial intelligence or deep learning capabilities structured to optimize operation of the plug-in 237 over time (hence, digitally aware neural dictation interface). For example, processing circuit 154 may include a convolutional neural network associated with one or more of the circuits, such as the speech enhancement circuit 359. In operation, the circuit 359 receives multiple samples of the user's voices (inputs). Convolution layers and programming are used by the circuit 359 to identify the syllables in the user's voice, patterns of speech, and other characteristics of the user's voice. This may include referencing other users' voice samples. This node processing results in a plurality of layers. Using a learning a processing (e.g., back-propagating), the circuit 359 begins to readily determine and identify the features associated with the user's voice as falling within defined categories or classes (e.g., typically used words such as a "the" and "next" may form a class, nouns may form a class, and other ways to group voice inputs may form additional classes). As more learning is performed, the circuit 359 may more quickly determine a user's voice input to be a certain letter, word, or phrase. This may result in the circuit 359 developing a list that correlates the user's voice samples to these known outputs. As such and then in operation, these letters, words, or phrases may be more quickly determined by the plug-in 237 locally moving forward which enhances operation of the plug-in. In other embodiments, different neural network, machine-learning, or artificial intelligence processes may be used.

Figure 4A:
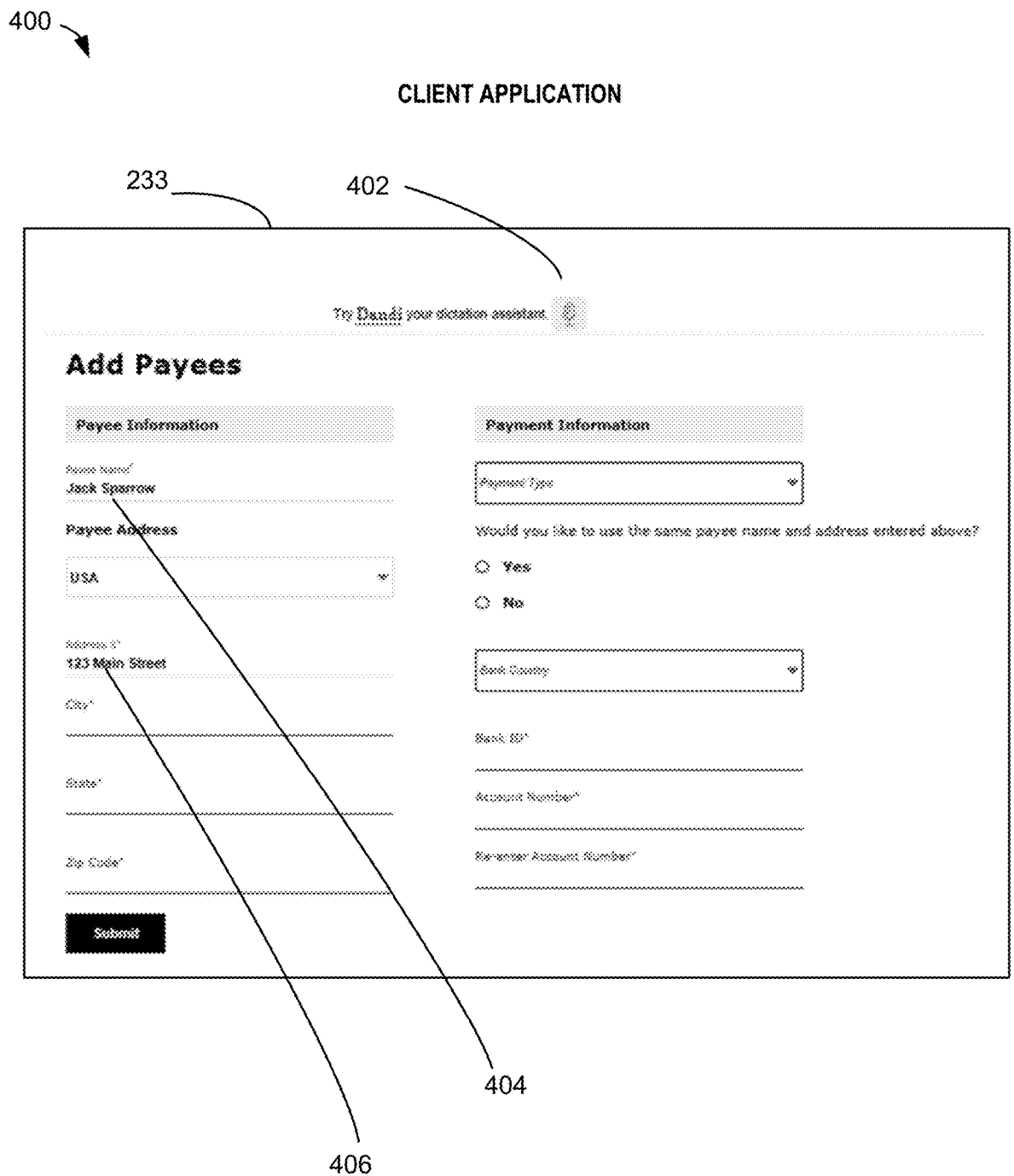
FIG. 4A is a display output of the user device during the hands-free mode of operation, according to the example embodiment.

Referring now to FIG. 4A, a display output 400 on the display screen 233 of a user device during a hands-free mode of operation for populating a form is shown, according to an example embodiment. In the embodiment of FIG. 4A, an animation 402 is displayed on the display screen 233, which is an indication to the user that the at least partial hands-free mode of operation of the user device is enabled. Thus, the animation 402 provides a clear indication on the display screen 233 to the user 120 that the system is ready for a voice input to populate individual fields of the form. The voice input provides a value of a field of the form. The voice input may also be a voice command to the user device to perform a specific operation. In the example of FIG. 4A, the user 120 issues a command to the client application 136 to modify the value of an earlier populated field pointed to by reference numeral 404. In some implementations, upon receiving an input value for the field to be modified, the client application 136 is structured to revert back to the next field where it was last awaiting a user voice input to populate the value of the field, which is pointed to by reference numeral 406. The populated values of the fields of the form are available for visual verification by the user 120 on the display screen 233 of the user device 130.

Figure 4B:
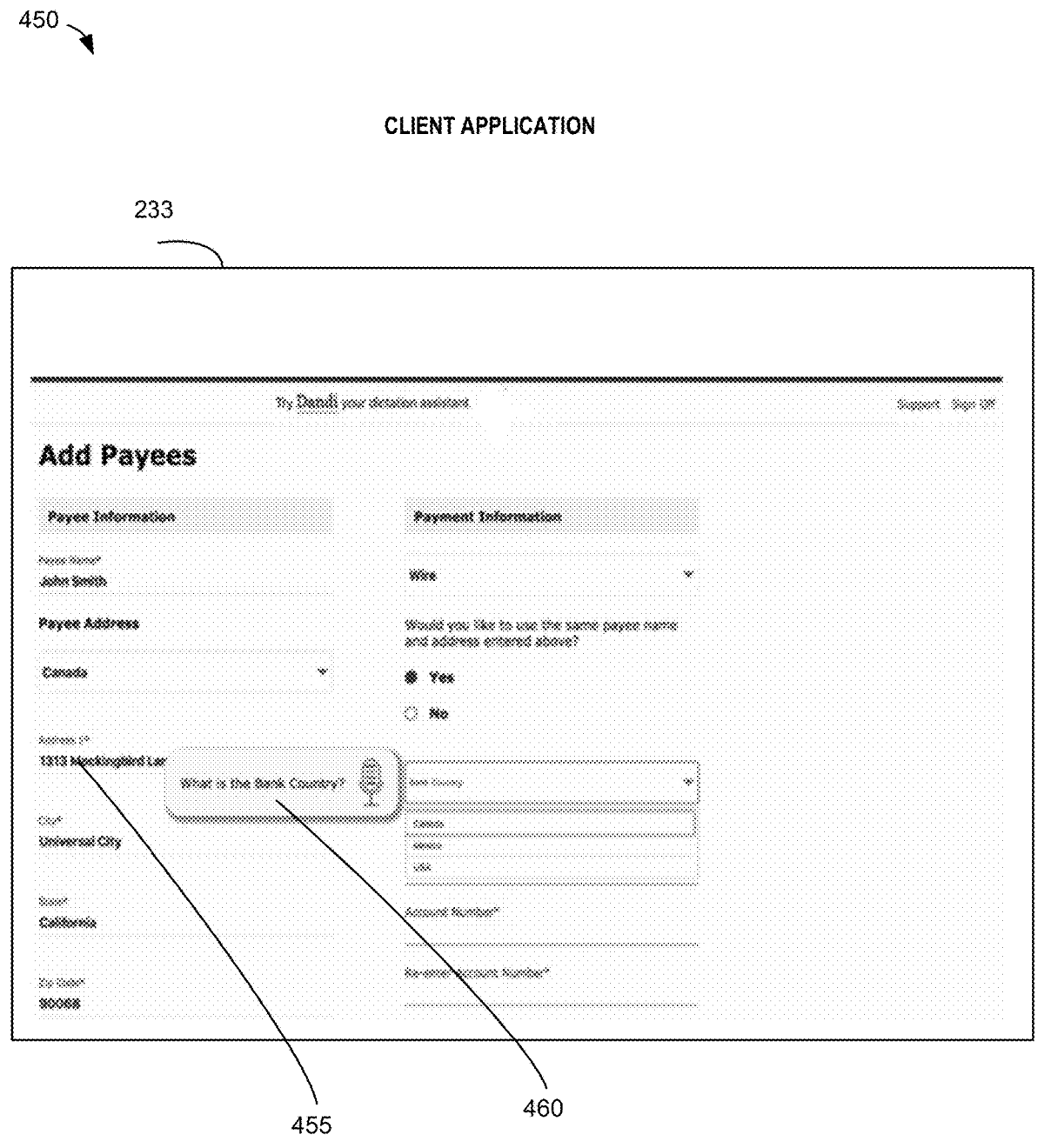

Referring now to FIG. 4B, another display output 450 on the display screen 233 of the user device 130 during a hands-free mode of operation for filing out a form is shown, according to an example embodiment. In the embodiment of FIG. 4B, there is no equivalent of the animation 402 of FIG. 4A that is displayed because the client application can only be in a listening mode waiting for user's 120 voice input, or in the prompting mode (prompting the user for the value of the next field of the form, for example). The absence of the animation is an indication to the user 120 that the at least partial hands-free mode of operation of the user device 130 by the user 120 is currently disabled. In some embodiments, a pop-up display 460 is provided on the display screen 233 of the user device 130 (or the user 120 is prompted through the microphone (not shown) of the user device 130). The previous and newly populated values 455 are available for visual verification by the user 120 on the display screen 233 of the user device 130.

Figure 5:
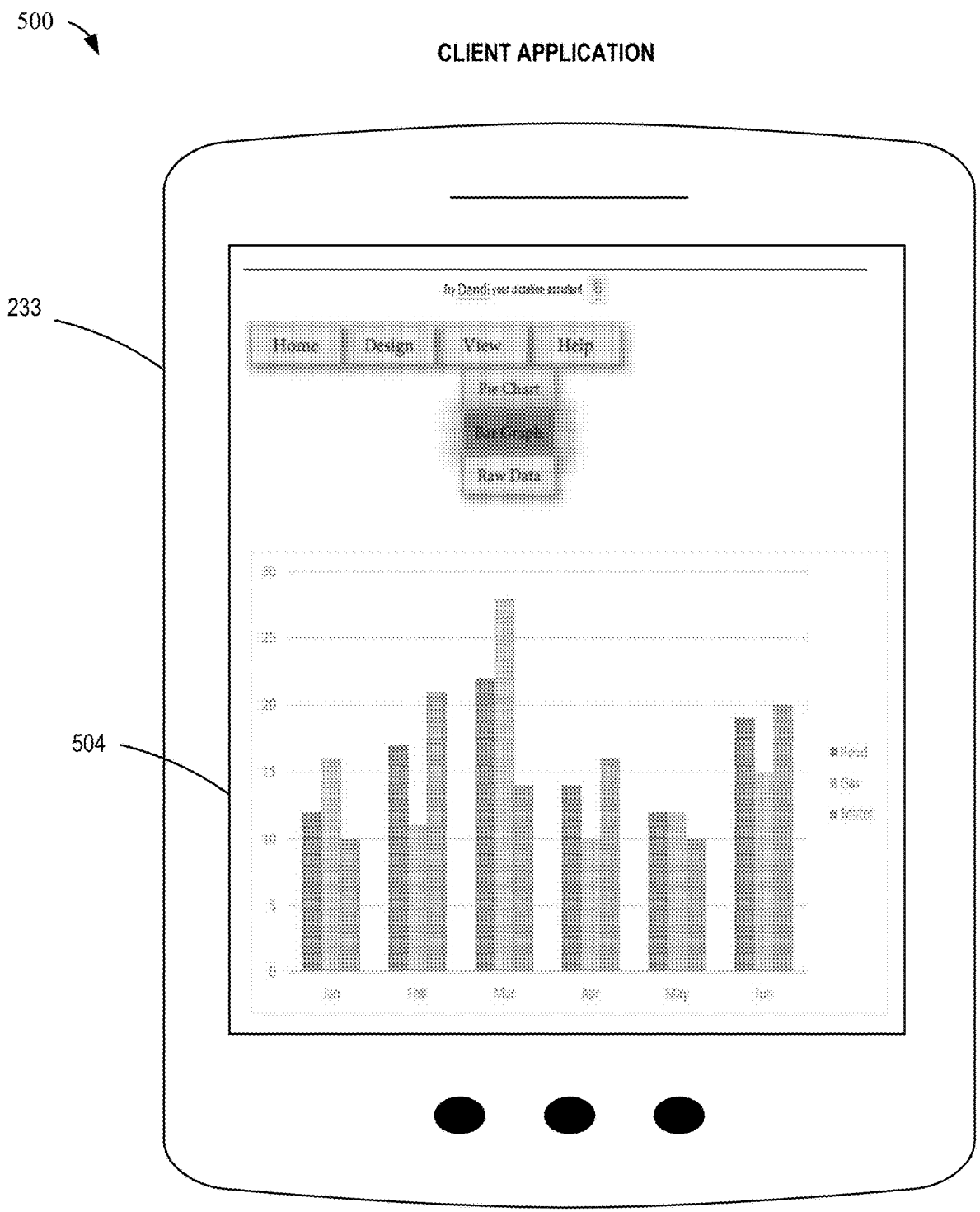
FIG. 5 depicts an output on the display screen of the user device of FIGS. 1-2, according to an example embodiment.

Referring now to FIG. 5, an embodiment 500 of a display output 502 of data visualization (i.e., a graphical representation of at least partial information associated with an electronic form) through voice input is shown, according to an example embodiment. FIG. 5 depicts a bar graph 504 as an example data visualization surfaced through a user's 120 voice input. In the example embodiment, a display output 502 on the display screen 233 of the user device 130 is shown based on the user's 120 selection of an option from a drop-down menu to display the underlying data as a bar graph (as opposed to other possible menu options, such as, a pie chart, or a scatter diagram, or time series graph, etc.), during a hands-free mode of operation. In the example embodiment of FIG. 5, the user's 120 voice input is used for purposes other than to provide voice input for the value of a field of a form, or to provide voice input for a recognized command. In the example embodiment, the user's voice input is used to select an option from a drop-down menu displayed on the display screen 233 of the user device 130, in order to visualize the associated data. In operation, the client application 136 executing on the user device 130 is structured to process different types of metadata and processing logic during the hands-free operation of the user device 130, to provide user experiences which go beyond just the populating the plurality of fields of a form by using voice input.

It should be understood that providing voice input by a user 120, or surfacing data visualization through voice input (as explained above in the discussion of FIG. 5) are non-limiting examples of hands-free operation of a user device 130 by a user 120 via the DANDI plug-in 237. In some embodiments, other example uses of hands-free operation are envisaged by, and fall under the scope of the present disclosure. In an example embodiment, hands-free operation is applicable to a Virtual Reality (VR) system that may include at least a headset or a visor, and a microphone. Conventionally, a user 120 engaged in a VR experience would have to take the visor off (i.e., get out of the VR experience) and would have to provide inputs for form-filling using a keyboard (or equivalent), in case the user 120 has to fill out a form while being engaged in the VR experience. But the hands-free mode of operation enabled by the present disclosure may be used for form-filling when the VR headset either supports a client application capable of downloading the DANDI plug-in or it is hard-coded into the computer thereby alleviate the user to have to disengage from the VR experience (e.g., without having to take the VR headset or visor off).

Figure 6:
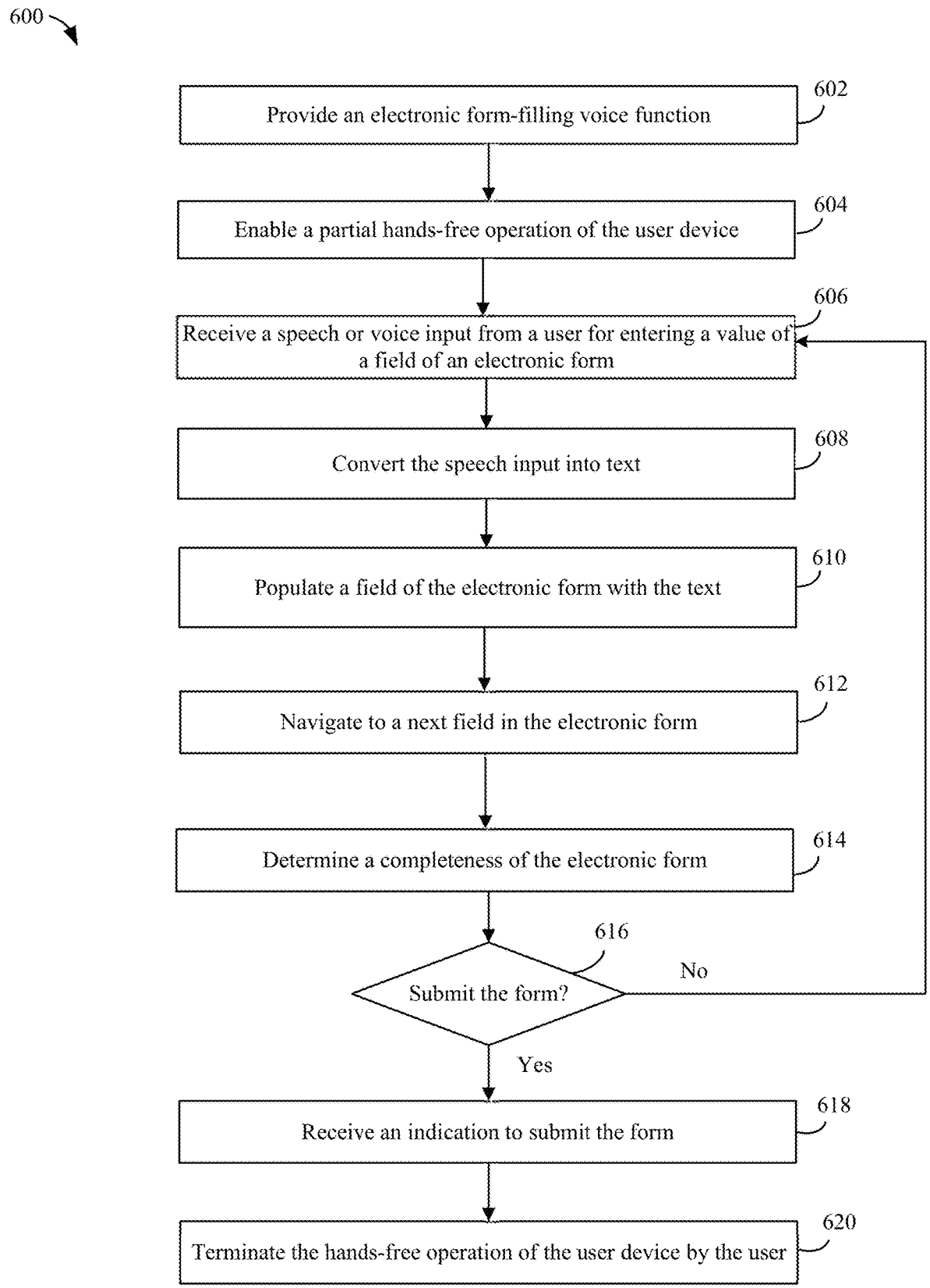
FIG. 6 is a flowchart of a method of populating a plurality of fields of a form using the user device of FIG. 1, according to an example embodiment.

Referring now to FIG. 6, a flowchart depicting a method 600 of populating a plurality of fields of a form and providing a conversational electronic form using the user device of FIG. 1 is shown, according to an example embodiment. Because the method 600 may be implemented with the components of FIG. 1, reference may be made to various components of the system 100 to aid explanation of the method 600.

At process 602, an electronic form-filling voice function is provided. In one embodiment, a plug-in and, in particular, the DANDI plug-in 237 is provided by the provider computing system 150. In this regard, process 602 is described as providing the DANDI plug-in 237 which provides the electronic form-filling voice functionality. In another embodiment, the functionality of the DANDI plug-in is already included with an application, such as a web browser application 241. The DANDI plug-in 237 includes or utilizes a speech synthesis API that converts a user's voice input into alphanumeric text. The DANDI plug-in 237 includes a metadata analysis feature whereby metadata associated with an electronic form is received by the DANDI plug-in 237, and then analyzed to determine the characteristics of the fields of the form. For example, the DANDI plug-in 237 is structured to determine, through metadata analysis, the characteristics about the total number of fields, the names of the fields, the data types of each of the fields, the maximum number of characters allowed in a field, the range of acceptable values for a field, etc. of the form.

At process 604, a partial hands-free operation of the user device 130 is enabled. For example, an electronic form may be displayed by the user device 130. The user 120 may then click on a portion of a webpage of the user device 130, or the user 120 may issue a specific voice command or request that may be recognized by the client application 136 as the initiation of the hands-free mode of operation of the user device 130 by the user 120 in order to populate the fields of the form. The client application 136 may process the voice command to initiate the hands-free mode of operation, or it may pass on the command to the provider computing system 150 through the network interface circuit 131. In the latter embodiment, the provider enhancement circuit 156 in the provider computing system 150 may interpret the voice command to initiate the at least partial hands-free mode of operation by the user 120 of the user device 130, and inform the client application 136 of the initiation of the at least partial hands-free mode of operation where "partial" means that the user is still able to provide manual inputs if desired.

At process 606, a speech or voice input is received. For example, the user 120 may provide a speech input regarding a field. The microphone 234 of the user device 130 may receive the speech input from the user 120, which corresponds to a value of a current field of a plurality of fields of the electronic form. The input is transmitted to the DANDI plug-in 237 and client application. The client application, via the microphone 234, may prompt the user for information associated with a particular field in order to provide a conversational form (e.g., the metadata analysis may determine what information is required and the client application may audibly request the user to provide this specific information via the microphone).

At process 608, the speech input is converted into text (e.g., alpha, numeric, or alphanumeric text). The client application 136, via the DANDI plug-in 237, converts the speech input received at process 606 from speech into text (e.g., alphanumeric text). In another embodiment, the client application 136 accesses a speech synthesis API residing on a speech synthesis API server 170 to convert the user speech input to alphanumeric text. In other embodiments, the client application 136 may include in-built support for a speech synthesis API that facilitates the synthesis of speech, i.e., conversion from speech-to-alphanumeric, and from alphanumeric-to-speech.

At process 610, a field of the form is populated by the value corresponding to the text. The value refers to the characters (e.g., alphanumeric text) that is placed in the field based on the conversion of the speech input to alphanumeric text. In one embodiment, the client application 136, via the DANDI plug-in 237, first determines which field of the form is to be populated by analyzing the metadata describing the plurality of fields of the form. Then the client application 136, via the DANDI plug-in 237, populates the appropriate field of the form with the converted alphanumeric text. Finally, the client application 136 may provide a display on the user device 130 to permit a visual verification by the user 120 that the field value was populated correctly. For example, the value may be provided on a display screen 233 of the user device 130. This permits visual verification by the user 120 that the value has been entered into the correct field of the form, and that the value corresponds to the speech input provided by the user 120.

At process 612, a navigation to a next field in the form is done. In this regard, the client application, via the DANDI-plug-in 237, may determine whether there are additional fields in the form based on the metadata and whether various fields are populated or compete. The client application via the plug-in 237 determines the priority order of the fields (i.e., the fields that should be filled first, such as the fields that require population before submission is allowed). At this point, the client application via the plug-in 237 determines that additional fields need to be populated and navigates to those fields for prompting the user to fill according to the determined order. As described above, determining when to move or navigating from field to field may be done via a variety of different ways. For example, after the passage of predetermined amount of time, the field may be determined to be populated and a prompt for information for the next field provided via the speaker to the user according to the determined order of fields. As another example, an affirmative input/confirmation such as a click or vocal command from the user is received that indicates the field is complete (a manual or verbal confirmation). As still another example, a prompt from instructions from the plug-in to a speaker of the user device may ask the user for information specific to the next field is provided. With regard to the last example of providing an audible prompt for the required information for the next field, this situation facilitates a conversational form whereby the plug-in navigates from field-to-field conversationally with the user until all or a sufficient amount of fields are populated. Throughout this navigation, the converted speech-to-text may be displayed in each field for visual verification by the user.

In some embodiments, a user may notice one or more field values that the user desires to change or modify. Accordingly, the microphone may receive a voice command from the user to modify a previously populated field value, and subsequently receive a speech input from the user to override the value of the previously populated field.

At process 614, a completeness of the form is determined. The client application 136, via the DANDI plug-in 237, analyzes the metadata describing the plurality of fields of the form. Based on the analysis, the client application 136 determines whether a sufficient number of fields have been populated (a "completeness"). The "sufficient number of fields" may be all the fields or a predefined subset of the fields based on the metadata. For example, some fields may be optional that are not necessary to be filled in order for the form to be determined to be "complete." In this regard, a certain subset of fields may be required to be populated before the form is allowed to be submitted. If yes, then the client application 136 proceeds to process 616. But if the determination is that there are more fields to populate, then the client application 136, via the DANDI plug-in 237, reverts back to process 612, to prompt the user 120 for the value of the next field to be populated.

At process 616, upon the form being determined to be complete, a prompt is provided to review the populated fields and/or to submit the form. For example, an audible prompt via the speaker from the DANDI plug-in and client application may be provided: "The form is complete. Would you like to submit the form?" The client application 136 provides a display on the user device 130 to prompt the user to indicate whether the user 120 wants to review the fields of the form, or whether the user 120 wants to submit the form.

At process 618, an indication to submit the form is received. Thus, submission of the form is enabled. The indication to submit the form may be provided vocally (e.g., as a vocal command as described above). The indication may be provided manually (e.g., clicking on a submit button on the form, clicking save on a PDF form, etc.). Upon the user 120 providing an indication to submit the form, the client application 136 proceeds to process 620. On the other hand, if the user 120 indicates at process 616 that the user 120 wants to review the populated values of the plurality of fields of the form, then the client application 136, via the DANDI plug-in 237, reverts back to process 612, and prompts the user 120 to re-enter or accept the existing values in each of the plurality of fields of the form.

At process 620, a termination or disablement of the hands-free operation of the user device 130 by the user 120 is accomplished. In one embodiment, this step is performed by the client application 136 of the user device 130. Further, this step may be performed automatically upon submission of the form. Or, an explicit input from the user may be provided (e.g., a vocal command or a manual entry), which disables the hands-free or at least partial hands-free mode of operation. As yet another embodiment, the functionality provided by the DANDI plug-in may always be on. In this regard, one need not enable or disable the hands-free mode of operation. Rather, a user may simply click on a DANDI icon to initiate use of the functionality of the DANDI plug-in with a form. Alternatively or additionally, a user may navigate to a web page that hosts a form and the functionality described herein with respect to the DANDI plug-in may be automatically initiated or semi-automatically initiated (e.g., "Please confirm you would like to use DANDI" may be provided as a prompt to the user upon reaching the form on the web page).

Method 600 provides the technical advantage of being able to navigate and populate the plurality of fields of an electronic form in a hands free manner by interacting using a user's voice. The user's voice is used both to receive commands, and also for obtaining the values of the fields of the form. In some embodiments, functionality implemented on the user device (e.g., analysis of the metadata, providing a speech synthesis API, etc.) may be offloaded to backend servers. This provides the technical advantage of less computational load on the processor(s) of the user device. Method 600 also provides several user benefits, such as the ability to populate entire forms in a hands free manner by carrying out a conversation with the user device. In this regard, the speaker of the user device based on instructions from the plug-in may prompt the user for a value of a next field of the plurality of fields without an affirmative input that the current field is populated in order to provide a conversational electronic form. Thus and like a conversation, there is a free flow of movement from one field (one conversation topic) to another field (another conversation topic). This reduces the friction typically experienced when filling out electronic forms. The processes of method 600 recognize the difference between user commands and user speech input, which makes populating the fields of the form easy for the user even when the user makes some mistakes by navigating back to previously populated fields through voice commands.

Method 600 also provides the benefit of error checking in at least two ways. First, the client application 136, via the DANDI plug-in 237, provides a visual depiction of the filled field as the field is filled. Second, the client application 136, via the DANDI plug-in 237, provides a visual depiction of the completed form prior to submission of the form. In some embodiments, the client application 136, via the DANDI plug-in 237, may read aloud the filled field as the field is populated. In operation, the client application 136 via the DANDI plug-in 237 may identify an error with respect to a provided field value (alternatively, as described below, the provider computing system 150 may determine one or more errors). For example, the DANDI plug-in 237 may expect certain values for each field based on the metadata analysis. If the provided information does not match the expected values (e.g., expecting a phone number and a home address value is provided), the client application 136 via the DANDI plug-in 237 may prompt the user to confirm their submission or request different information. Accordingly and during population of the fields, errors may be determined by the DANDI plug-in 237 with respect to one or more field values. The client application via the DANDI plug-in may compare the received speech input (or converted text) to the expected value for the field(s) of the form and where the expected values do not match the speech input (or converted text), an error is flagged. The DANDI plug-in 237 may then prompt the user to confirm the field values or to change the field values with determined errors. In some embodiments and prior to submission of the form, the client application 136, via the DANDI plug-in 237, may read aloud each field and each field value. In either situation, a user may receive an auditory and visual indication of the populated field and/or fields of the form. Accordingly, an ability to check for errors is provided by the DANDI plug-in 237 to the user.

In some embodiments and in addition to the error checking provided, form validation and error messaging may be provided. In this way, the client application 136, via the DANDI plug-in 237 may provide a message to the user to confirm the value of one or more fields of the form. For example, the field may be date-of-birth yet the value depicts the name of the user. The DANDI plug-in 237 may compare the expected field value to the actual field value to determine that a potential error exists. For example, the expected field values are numerical in nature yet the received converted text is alpha characters. As a result, the client application 136 via the DANDI plug-in 237 may provide a message, such as an audible question, to the user: "The date-of-birth field includes a name and not a date. Would you like to return to this field to change the value?" In another embodiment, the error checking may include automatic correction. With respect to the previous example, the client application via the DANDI plug-in 237 may recognize that the value provided by the user is their name and the field is date-of-birth. Rather than populating the date-of-birth field, the client applicant via the DANDI plug-in 237, using the metadata analysis of the form, locates and populates the name field with the user's name. Then, the client application via the DANDI plug-in audibly prompts the user for their date-of-birth for the date-of-birth field. In this way, a smart form-filling aspect is provided via the DANDI plug-in 237. As a variation to this aspect and using information from the auto-complete circuit 361, may proactively prevent errors as they may occur. Sticking with the above example and knowing that the field is date-of-birth, despite the user providing an audible input of their name, the visually depicted field is their date-of-birth. In this regard, the circuit 361 provides information regarding the user's date of birth. As the DANDI plug-in 237 compares the user's input (their name) to the field value (date-of-birth), the client application via the DANDI plug-in may disregard the user's voice input in favor of the date-of-birth information from the circuit 361 because this information matches the required field value. Thus, a proactive error correction feature may be provided.

As mentioned above, a form validation feature may also be provided. This validation provides a holistic error examination process. In one embodiment and after the form is submitted, the form is sent to the provider computer system 150 rather than the end recipient computing system. Using stored submitted forms associated with the user, the system 150 compares the field values to previously-submitted field values. The system 150 may then identify potential errors and either fix them before submitting the form or transmit a message back to the user for potential correction (e.g., a verbal prompt, a written message such as a push notification, etc.). If the system 150 determines that the form appears to be correctly filled (e.g., by matching the field values with the required information for each field to ensure a match), then the system 150 transmits the form to the end recipient. As another example, an audible prompt may be provided to the user to check the form prior submission via the client application. If the user responds in the affirmative, then the form-to-be-submitted is transmitted to the system 150 for validation. This may be beneficial for long and complex forms, such as mortgage forms where additional analysis is desired to ensure no or likely no errors. In another embodiment, a carbon copy of the form and the populated fields is provided to the system by the client application during population of the form. This may enable simultaneous error-checking of the form by the system 150. These validation procedures show the potential involvement of the system 150 in attempting to mitigate errors in filling of the form. This may be used when such functionality is not included with the DANDI plug-in 237.

As mentioned herein, artificial intelligence, machine learning, and the like may be used by the processing circuit of the provider computing system 150. The use of artificial intelligence, such as the above-described convolutional neural networks, may also be used in the error-checking process of the electronic form prior to submission. As described herein, a learning by the system 150 of the user's typical responses (e.g., home address, favorite pet, etc.) and voice characteristics via artificial intelligence may enable a quicker filling of forms and with less likelihood for errors.

Figure 7:
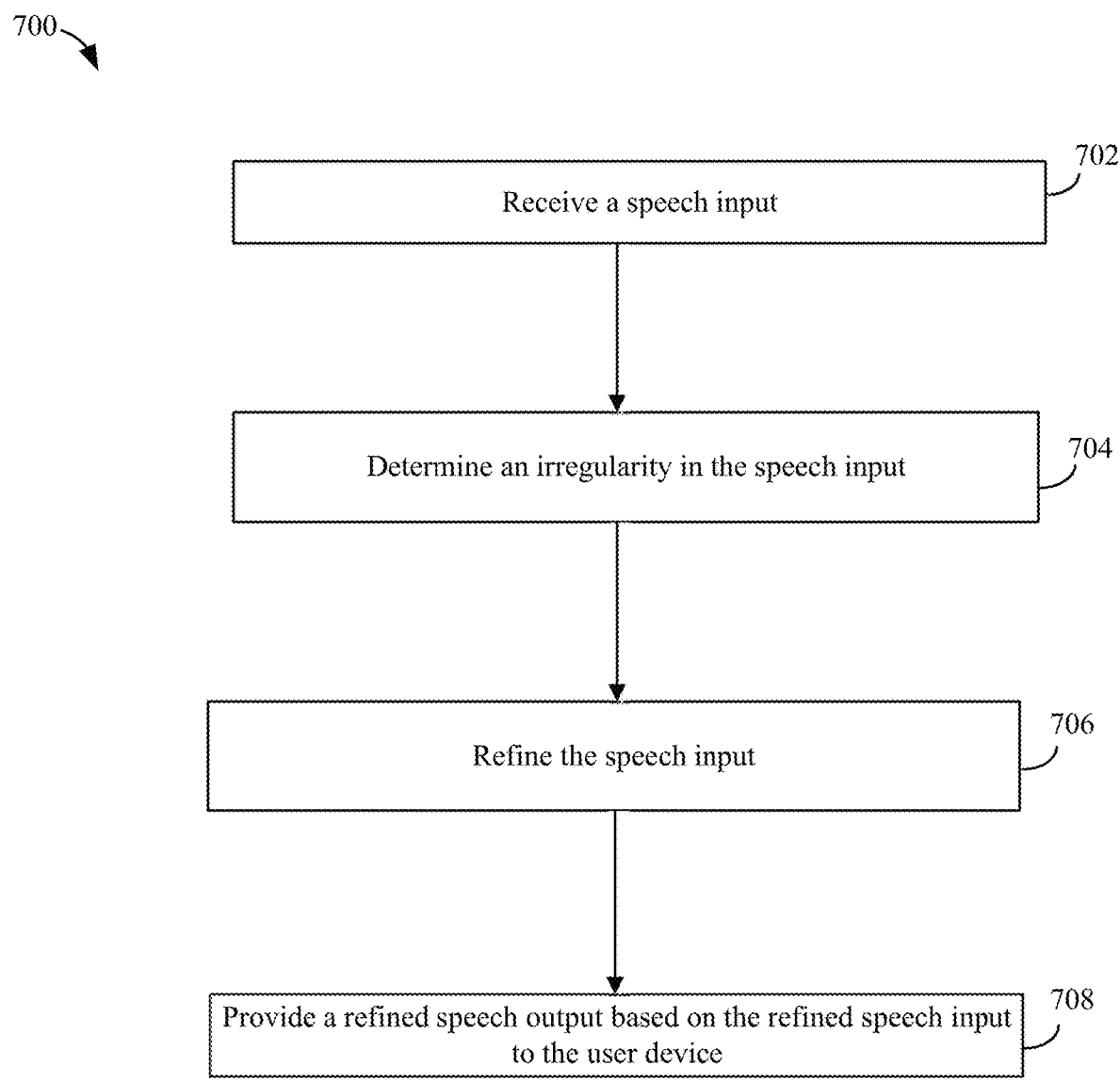
FIG. 7 is a flowchart of a method of providing refinements to speech input samples by the provider computing system of FIG. 1, according to an example embodiment.

FIG. 7 is a flowchart depicting a method 700 of providing refinements to speech input samples by the provider computing system 150, according to an example embodiment. In some embodiments, the speech input received from a user 120 may be distorted, garbled, attenuated, or irregular in some manner (for example, there are unexpected gaps in the speech input). In some embodiments, the irregularity in the speech input is due to an accent in the speech, or due to the speech input being in a foreign language.

At process 702, a speech input is received. In particular, a speech input for filling out a field of a plurality of fields of a form is a received. The client application 136, via the DANDI plug-in 237, processes the speech input by passing the received speech input to the speech synthesis API.

At process 704, an irregularity in the speech input is determined. In one embodiment, the client application 136, via the DANDI plug-in 237, fails to recognize the syllables in the speech input after processing the speech input through the speech synthesis API. Due to the failure in recognizing the syllables in the received speech input, the client application 136 classifies the speech input as irregular. The client application 136 then forwards the speech input to the provider computing system 150 for refinement of the quality of the speech input. Some of the reasons for the speech input to be irregular may be due to attenuation of the speech input, or due to the presence of background noise, or due to an accent that is hard to recognize. As an example, the provider computing system 150 may determine that the irregularity is a non-English language speech input. This may be identified by the client application via the DANDI plug-in in that the speech input is not recognized, which causes the client application to transmit the speech input to the provider computing system 150. The processing circuit of the system 150 may then determine that speech input is a non-English language speech input (e.g., via the speech enhancement circuit 359). Then, the provider computing system 150 may translating (e.g., via the speech enhancement circuit 359) the non-English language speech input into the English language as part of the refinement. Because of the storage capacity of the system 150, a translation may be readily accomplished with minimal time by the system 150 versus the client application and DANDI plug-in 237.

At process 706, the speech input is refined. In one embodiment, the speech enhancement circuit 359 of the provider computing system 150 processes the received speech input with artificial intelligence (AI) smart algorithms to refine the speech input samples. In some embodiments, the AI smart algorithms look up the historical voice inputs for a user 120 in the provider database 365 to identify a pattern in the user's 120 speech input, and then use extrapolation to refine the current speech input samples received in irregular form. In another embodiment, the speech enhancement circuit 359 digitally enhances the speech input samples through filtering and digital processing techniques to obtain better quality samples of the user's 120 speech input to improve the reliability of the recognition of the speech input. In still another embodiment, the speech enhancement circuit 359 of the provider computing system 150 leverages stored information for the specific user 120 in a provider database 365 by analyzing patterns in the user's past speech inputs. Based on the patterns, various refinements to the speech input may be performed. For example, based on known pronunciations of the user's home address, this information may be used to determine that a speech input is regarding the user's home address.

At process 708, a refined speech output based on the refined speech input is provided. In particular, the speech enhancement circuit 359 of the provider computing system 150 is structured to provide the refined speech output back to the client application 136 of the user device 130. Then, the processing circuit 154 may convert the refined speech input into text (e.g., alpha, numeric, alphanumeric text). The system 150 then provides the text converted from the refined speed input to the user device. The client application 136 uses the text from the refined speech output to populating the value of a field in order to fill an electronic form in accord with method 600 and the other disclosure contained herein.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively, or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc.

Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A user device, comprising:
    a processing circuit comprising one or more processors coupled to non-transitory memory, the processing circuit configured to:
        automatically initiate a hands-free mode of operation based on a first input from a user, wherein the hands-free mode of operation comprises enabling functionality of a plug-in installed on the user device;
        receive a second input from the user corresponding to a value of a current field of a plurality of fields of an electronic form provided on a display screen of the user device;
        convert, using the plug-in, the second input into the value of the current field, wherein the value is identified from the second input by comparing syllables of the second input to known syllables associated with a historical input of the user;
        display, on the display screen of the user device, the value in the current field;
        determine, using the plug-in, that the value in the current field matches an expected value of the current field;
        prompt the user for a value of a subsequent field of the plurality of fields;
        receive a third input in response to the prompt for the value of the subsequent field;
        determine, based on a first metadata analysis of the third input, that a value corresponding to the third input does not match an expected value of the subsequent field;
        determine, based on a second metadata analysis of one or more fields of the plurality of fields, that the value corresponding to the third input matches an expected value of another field, different from the subsequent field, of the plurality of fields;
        provide, via the display screen, a message that informs the user that the value corresponding to the third input does not match the expected value of the subsequent field and that the value corresponding to the third input matches the expected value of the another field;
        prompt the user to accept a placement of the value corresponding to the third input in the another field;
        responsive to receiving acceptance of the placement of the value corresponding to the third input, display, on the display screen of the user device, the value corresponding to the third input in the another field; and
        prompt the user to submit the electronic form in response to determining that the electronic form is complete based on a determination that a predefined subset of the plurality of fields are populated.

2. The user device of claim 1, wherein the processing circuit is further configured to:
    receive a command from the user to modify a value of a previously populated field; and
    receive a fourth input from the user to override the value of the previously populated field.

3. The user device of claim 1, wherein the user device is one of a laptop, a desktop, a tablet, a smartphone, or a virtual reality headset, and wherein the user device includes a web browser operable by the processing circuit.

4. The user device of claim 1, wherein the value is alpha, numeric, or alphanumeric text, and wherein the processing circuit is further configured to:
    receive metadata associated with the electronic form; and
    determine at least one characteristic of the electronic form based on the first metadata analysis or the second metadata analysis.

5. The user device of claim 4, wherein the at least one characteristic of the electronic form includes a total number of fields, an identification of at least one field that is required to be populated before submission of the electronic form is permitted, a maximum number of characters allowed for each field in the plurality of fields, or a range of acceptable values for each field in the plurality of fields.

6. The user device of claim 1, wherein the processing circuit is further configured to determine a priority order of navigating to and populating each field in the plurality of fields of the electronic form.

7. The user device of claim 6, wherein the determination of the priority order of navigation is based on the first metadata analysis associated with the electronic form.

8. The user device of claim 1, wherein the user device is an automated teller machine, and wherein the processing circuit is further configured to determine the current field is populated in response to a predetermined amount of time passing after displaying the value in the current field.

9. The user device of claim 1, wherein the processing circuit is further configured to determine that the current field is populated based on receiving at least one of a verbal confirmation or a manual confirmation.

10. The user device of claim 1, wherein the processing circuit is further configured to:
navigate to certain fields in the plurality of fields in accordance with a determined order of the certain fields in the plurality of fields for populating, wherein the determined order is based on determining the certain fields required to be populated before the electronic form is permitted to be submitted.

11. A method, comprising:
automatically initiating, by a processing circuit of a computing device, a hands-free mode of operation for the computing device based on a first input from a user, wherein the hands-free mode of operation comprises enabling functionality of a plug-in installed on the processing circuit;
receiving, by the processing circuit, a second input from the user corresponding to a value of a current field of a plurality of fields of an electronic form provided on a display screen of the computing device;
converting, by the processing circuit using the plug-in, the second input into the value of the current field, wherein the value is identified from the second input by comparing syllables of the second input to known syllables associated with a historical input of the user;
displaying, by the processing circuit on the display screen of the computing device, the value in the current field;
determining, by the processing circuit using the plug-in, that the value in the current field matches an expected value of the current field;
prompting, by the processing circuit, the user for a value of a subsequent field of the plurality of fields;
receiving, by the processing circuit, a third input in response to the prompt for the value of the subsequent field;
determining, by the processing circuit based on a first metadata analysis of the third input, that a value corresponding to the third input does not match an expected value of the subsequent field;
determining, by the processing circuit based on a second metadata analysis of one or more fields of the plurality of fields, that the value corresponding to the third input matches an expected value of another field, different from the subsequent field, of the plurality of fields;
providing, by the processing circuit, via the display screen, a message that informs the user that the value corresponding to the third input does not match the expected value of the subsequent field and that the value corresponding to the third input matches the expected value of the another field;
prompting, by the processing circuit, the user to accept a placement of the value corresponding to the third input in the another field;
responsive to receiving acceptance of the placement of the value corresponding to the third input, displaying, by the processing circuit on the display screen of the computing device, the value corresponding to the third input in the another field; and
prompting, by the processing circuit, the user to submit the electronic form in response to determining that the electronic form is complete based on a determination that a predefined subset of the plurality of fields are populated.

12. The method of claim 11, further comprising:
receiving, by the processing circuit, a command from the user to modify a value of a previously populated field; and
receiving, by the processing circuit, a fourth input from the user to override the value of the previously populated field.

13. The method of claim 11, wherein the value is alpha, numeric, or alphanumeric text, and wherein the method further comprises:
receiving, by the processing circuit, metadata associated with the electronic form; and
determining, by the processing circuit, at least one characteristic of the electronic form based on the first metadata analysis or the second metadata analysis.

14. The method of claim 13, wherein the at least one characteristic of the electronic form includes a total number of fields, an identification of at least one field that is required to be populated before submission of the electronic form is permitted, a maximum number of characters allowed for each field in the plurality of fields, or a range of acceptable values for each field in the plurality of fields.

15. The method of claim 14, further comprising determining a priority order of navigating to and populating each field in the plurality of fields of the electronic form, wherein the determination of the priority order of navigation is based on the first metadata analysis associated with the electronic form.

16. The method of claim 11, wherein the computing device is an automated teller machine, and wherein the method further comprises determining, by the processing circuit, that the current field is populated in response to a predetermined amount of time passing after displaying the value in the current field.

17. A non-transitory computer-readable storage media having instructions stored thereon that, when executed by a processing circuit, cause the processing circuit to perform operations comprising:
automatically initiating an at least partial hands-free mode of operation of a computing device based on a first input from a user, wherein the at least partial hands-free mode of operation comprises enabling functionality of a plug-in installed on the processing circuit;
receiving a second input from the user corresponding to a value of a current field of a plurality of fields of an electronic form provided on a display screen of the computing device;
converting, using the plug-in, the second input into the value of the current field, wherein the value is identified from the second input by comparing syllables of the second input to known syllables associated with a historical input of the user;
displaying, on the display screen of the computing device, the value in the current field;

determining, using the plug-in, that the value in the current field matches an expected value of the current field;

prompting the user for a value of a subsequent field of the plurality of fields;

receiving a third input in response to the prompt for the value of the subsequent field;

determining, based on a first metadata analysis of the third input, that a value corresponding to the third input does not match an expected value of the subsequent field;

determining, based on a second metadata analysis of one or more fields of the plurality of fields, that the value corresponding to the third input matches an expected value of another field, different from the subsequent field, of the plurality of fields;

providing, via a display screen, a message that informs the user an indication that the value corresponding to the third input does not match the expected value of the subsequent field and that the value corresponding to the third input matches the expected value of the another field;

prompting the user to accept a placement of the value corresponding to the third input in the another field;

responsive to receiving acceptance of the placement of the value corresponding to the third input, displaying, on the display screen of the computing device, the value corresponding to the third input in the another field; and prompting the user to submit the electronic form in response to determining that the electronic form is complete based on a determination that a predefined subset of the plurality of fields are populated.

18. The non-transitory computer-readable storage media of claim 17 having additional instructions stored thereon that, when executed by the processing circuit, cause the processing circuit to perform additional operations comprising:

receiving metadata associated with the electronic form; and determining at least one characteristic of the electronic form based on the first metadata analysis or the second metadata analysis.

19. The non-transitory computer-readable storage media of claim 18, wherein the at least one characteristic of the electronic form includes a total number of fields, an identification of at least one field that is required to be populated before submission of the electronic form is permitted, a maximum number of characters allowed for each field in the plurality of fields, or a range of acceptable values for each field in the plurality of fields.

20. The non-transitory computer-readable storage media of claim 17 having additional instructions stored thereon that, when executed by the processing circuit, cause the processing circuit to perform additional operations comprising:

navigating to certain fields in the plurality of fields in accordance with a determined order of the certain fields in the plurality of fields for populating, wherein the determined order is based on determining the certain fields required to be populated before the electronic form is permitted to be submitted.

* * * * *